United States Patent
Van Landingham, Jr. et al.

(10) Patent No.: US 8,938,848 B2
(45) Date of Patent: Jan. 27, 2015

(54) MOP AGITATOR

(75) Inventors: Alfred Reneau Van Landingham, Jr., Stephens City, VA (US); Jesse Andrew Matola, Winchester, VA (US)

(73) Assignee: Rubbermaid Commerical Products, LLC, Winchester, VA (US)

( * ) Notice: Subject to any disclaimer, the term of this patent is extended or adjusted under 35 U.S.C. 154(b) by 430 days.

(21) Appl. No.: 12/766,192

(22) Filed: Apr. 23, 2010

(65) Prior Publication Data

US 2011/0099745 A1    May 5, 2011

Related U.S. Application Data

(60) Provisional application No. 61/308,536, filed on Feb. 26, 2010, provisional application No. 61/256,508, filed on Oct. 30, 2009.

(51) Int. Cl.
| | |
|---|---|
| *A47L 13/58* | (2006.01) |
| *A47L 13/60* | (2006.01) |
| *A47L 13/59* | (2006.01) |
| *A47L 13/258* | (2006.01) |
| *A47J 47/18* | (2006.01) |

(52) U.S. Cl.
CPC ............... *A47L 13/58* (2013.01); *A47L 13/60* (2013.01); *A47L 13/59* (2013.01); *A47J 47/18* (2013.01); *A47L 13/258* (2013.01)
USPC ............................. 15/264; 15/104.92; 15/142

(58) Field of Classification Search
CPC .......... A47J 47/18; A47J 47/20; A47L 13/58; A47L 13/59; A47K 7/043; B44D 3/128
USPC ................. 15/104.92, 142, 257.01, 260–264, 15/154.2, 147.1, DIG. 9; 210/167.01, 210/172.1, 241; 220/570, 760, 736
See application file for complete search history.

(56) References Cited

U.S. PATENT DOCUMENTS

| | | | |
|---|---|---|---|
| 750,354 | A | 1/1904 | Fowler et al. |
| 790,030 | A | 5/1905 | Crawford |

(Continued)

FOREIGN PATENT DOCUMENTS

| | | | | |
|---|---|---|---|---|
| CA | 2215574 C | * | 3/2004 | ............... A47L 13/58 |
| CN | 200971426 | * | 11/2007 | ............... A47L 13/59 |

(Continued)

OTHER PUBLICATIONS

Co-pending U.S. Appl. No. 12/766,197, filed Apr. 23, 2010.

(Continued)

*Primary Examiner* — Robyn Doan
*Assistant Examiner* — Tatiana Nobrega
(74) *Attorney, Agent, or Firm* — Dennis J. Williamson; Moore & Van Allen PLLC

(57) ABSTRACT

A mop bucket comprises an internal compartment defined by a side wall for retaining a liquid. A first bracket is supported in the compartment and supports a first agitator blade and a second bracket supported in the compartment and supports a second agitator blade such that the agitator blades are spaced from one another a distance sufficient to receive a mop. The first agitator blade and the second agitator blade each comprising a plurality of fins extending from a planar support surface. The first agitator blade and said second agitator blade may also comprise a plurality of bristles extending from a planar support surface.

14 Claims, 37 Drawing Sheets

(56) References Cited

U.S. PATENT DOCUMENTS

| | | | |
|---|---|---|---|
| 2,255,091 A * | 9/1941 | Vaughn | 15/260 |
| 2,290,217 A * | 7/1942 | Trindl et al. | 15/261 |
| 2,538,336 A | 1/1951 | Smith | |
| 2,623,230 A * | 12/1952 | Feinen | 15/142 |
| 2,787,015 A * | 4/1957 | Flam | 15/142 |
| 2,794,997 A | 6/1957 | Channell | |
| 2,827,648 A * | 3/1958 | Geisz | 15/257.05 |
| 3,045,252 A | 7/1962 | Sorrells | |
| 3,383,158 A | 5/1968 | Leland | |
| 3,441,973 A | 5/1969 | Turk | |
| 3,926,452 A | 12/1975 | Goines | |
| 4,022,228 A * | 5/1977 | Ropp et al. | 132/75 |
| 4,161,799 A | 7/1979 | Sorrells | |
| 4,202,361 A * | 5/1980 | Bills | 132/123 |
| 4,439,884 A * | 4/1984 | Giorni | 15/104.92 |
| 4,494,267 A * | 1/1985 | Fredley | 15/104.92 |
| 4,680,826 A | 7/1987 | Schunter | |
| D296,254 S | 6/1988 | Jaros et al. | |
| 4,798,307 A | 1/1989 | Evrard | |
| 4,815,160 A | 3/1989 | Smith, Jr. | |
| 4,821,358 A * | 4/1989 | Wyckoff et al. | 15/104.92 |
| 4,827,562 A | 5/1989 | Blase et al. | |
| 4,845,800 A | 7/1989 | Pederson et al. | |
| 4,888,847 A * | 12/1989 | Montijo | 15/263 |
| 4,965,906 A * | 10/1990 | Mauro | 15/104.92 |
| 5,050,655 A * | 9/1991 | Borenstein | 150/160 |
| 5,081,735 A * | 1/1992 | Wyatt et al. | 15/104.92 |
| 5,175,904 A | 1/1993 | Pagani | |
| 5,228,716 A | 7/1993 | Dahl | |
| D338,299 S | 8/1993 | Delmerico et al. | |
| 5,245,724 A | 9/1993 | Sacks | |
| 5,289,953 A | 3/1994 | McMillan, III et al. | |
| 5,404,610 A * | 4/1995 | Coyer et al. | 15/104.92 |
| 5,454,131 A * | 10/1995 | Mackenzie | 15/104.92 |
| 5,476,282 A | 12/1995 | Dahl | |
| 5,548,865 A | 8/1996 | Pagani | |
| 5,666,684 A * | 9/1997 | Cussen | 15/104.92 |
| 5,687,444 A * | 11/1997 | Hakker | 15/104.92 |
| 5,794,301 A * | 8/1998 | Hietala | 15/104.92 |
| 5,810,021 A * | 9/1998 | Walker | 132/74.5 |
| 5,819,357 A * | 10/1998 | Gould | 15/182 |
| 5,822,820 A * | 10/1998 | Heisler | 15/21.2 |
| 5,864,914 A | 2/1999 | Salmon | |
| 5,941,410 A * | 8/1999 | Mangano | 220/735 |
| 5,971,199 A * | 10/1999 | Jackson et al. | 220/608 |
| 6,000,094 A | 12/1999 | Young | |
| 6,006,397 A | 12/1999 | Williams et al. | |
| 6,026,530 A | 2/2000 | Camp, Jr. | |
| 6,098,239 A | 8/2000 | Vosbikian | |
| 6,119,298 A | 9/2000 | Kenmochi | |
| 6,279,195 B1 | 8/2001 | Biggs | |
| 6,283,170 B1 | 9/2001 | Robinson | |
| 6,296,261 B1 | 10/2001 | deGoma | |
| 6,343,612 B1 | 2/2002 | Dahl | |
| 6,389,638 B1 * | 5/2002 | Dickinson et al. | 15/261 |
| D465,890 S | 11/2002 | Rivera et al. | |
| 6,540,168 B1 | 4/2003 | Archer et al. | |
| 6,662,401 B2 | 12/2003 | Zorzo | |
| 6,736,969 B2 | 5/2004 | Milne | |
| 6,851,391 B1 * | 2/2005 | Mulich et al. | 119/651 |
| 7,200,891 B1 * | 4/2007 | McCulloch et al. | 15/104.92 |
| 7,207,342 B1 | 4/2007 | Daniels | |
| 7,225,499 B1 | 6/2007 | Duncan et al. | |
| D549,414 S | 8/2007 | Van Landingham, Jr. | |
| 7,350,260 B2 | 4/2008 | Papa | |
| 7,356,868 B1 * | 4/2008 | Herrmann | 15/106 |
| 7,434,292 B2 | 10/2008 | Ramirez Moreno | |
| 7,458,590 B2 | 12/2008 | Vanderberg et al. | |
| 7,487,881 B2 | 2/2009 | Watzke et al. | |
| 7,490,745 B1 | 2/2009 | Robinson | |
| 7,497,448 B2 | 3/2009 | Brown | |
| 7,607,191 B2 | 10/2009 | Morris et al. | |
| 7,735,182 B2 | 6/2010 | Morris et al. | |
| 8,042,215 B2 * | 10/2011 | Thibault | 15/142 |
| 8,082,620 B2 | 12/2011 | Hoyle et al. | |
| D672,107 S | 12/2012 | Van Landingham, Jr. et al. | |
| D672,930 S | 12/2012 | Van Landingham, Jr. et al. | |
| 2002/0069472 A1 * | 6/2002 | Glass | 15/104.92 |
| 2002/0092113 A1 | 7/2002 | Cann | |
| 2002/0170132 A1 * | 11/2002 | Brent | 15/104.92 |
| 2003/0217423 A1 * | 11/2003 | Larsen | 15/104.92 |
| 2005/0076465 A1 | 4/2005 | Rousey | |
| 2005/0086760 A1 | 4/2005 | Young | |
| 2006/0085939 A1 * | 4/2006 | Petner | 15/261 |
| 2007/0006413 A1 | 1/2007 | Lee | |
| 2007/0241049 A1 | 10/2007 | Tytar | |
| 2008/0257384 A1 * | 10/2008 | Farrell | 134/6 |
| 2008/0302715 A1 | 12/2008 | Venville | |
| 2009/0094769 A1 | 4/2009 | Wilson | |
| 2011/0080660 A1 | 4/2011 | Kerle | |
| 2011/0099745 A1 | 5/2011 | Van Landingham, Jr. et al. | |
| 2011/0099837 A1 | 5/2011 | Matola et al. | |
| 2011/0100395 A1 | 5/2011 | Van Landingham, Jr. et al. | |
| 2011/0303589 A1 | 12/2011 | Kuennen et al. | |
| 2012/0110814 A1 | 5/2012 | Matola et al. | |

FOREIGN PATENT DOCUMENTS

| | | |
|---|---|---|
| EP | 1516575 A2 | 3/2005 |
| GB | 2260691 A | 4/1993 |
| WO | 03065869 A1 | 8/2003 |
| WO | 2006002654 A1 | 12/2006 |
| WO | 2008106780 A1 | 9/2008 |
| WO | 2006094918 A1 | 9/2009 |

OTHER PUBLICATIONS

Co-pending U.S. Appl. No. 12/766,184, filed Apr. 23, 2010.
Co-pending U.S. Appl. No. 12/766,174, filed Apr. 23, 2010.
International Searching Authority, International Search Report issued for International application No. PCT/US2010/054273, Dec. 28, 2010.
International Searching Authority, Written Opinion issued for International application No. PCT/US2010/054273, Dec. 28, 2010.
International Searching Authority, International Search Report issued for International application No. PCT/US2010/054283, Dec. 17, 2010.
International Searching Authority, Written Opinion issued for International application No. PCT/US2010/054283, Dec. 17, 2010.
International Searching Authority, International Search Report issued for International application No. PCT/US2010/054287, Dec. 28, 2010.
International Searching Authority, Written Opinion issued for International application No. PCT/US2010/054287, Dec. 28, 2010.
International Searching Authority, International Search Report issued for International application No. PCT/US2010/054293, Dec. 27, 2010.
International Searching Authority, Written Opinion issued for International application No. PCT/US2010/054293, Dec. 27, 2010.
Rubbermaid Commercial Products, LLC et al., International Application No. PCT/US2010/054273, International Preliminary Report on Patentability and Written Opinion, May 10, 2012.
Rubbermaid Commercial Products, LLC et al., International Application No. PCT/US2010/054283, International Preliminary Report on Patentability and Written Opinion, May 10, 2012.
Rubbermaid Commercial Products, LLC et al., International Application No. PCT/US2010/054287, International Preliminary Report on Patentability and Written Opinion, May 10, 2012.
Rubbermaid Commercial Products, LLC et al., International Application No. PCT/US2010/054293, International Preliminary Report on Patentability and Written Opinion, May 10, 2012.

* cited by examiner

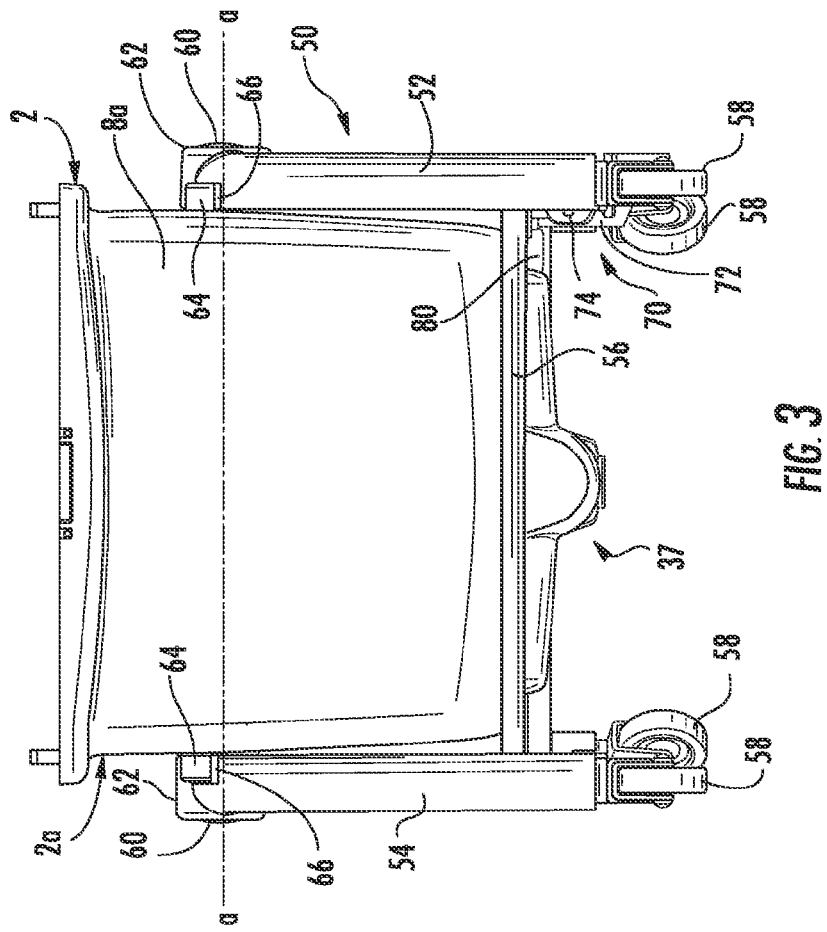
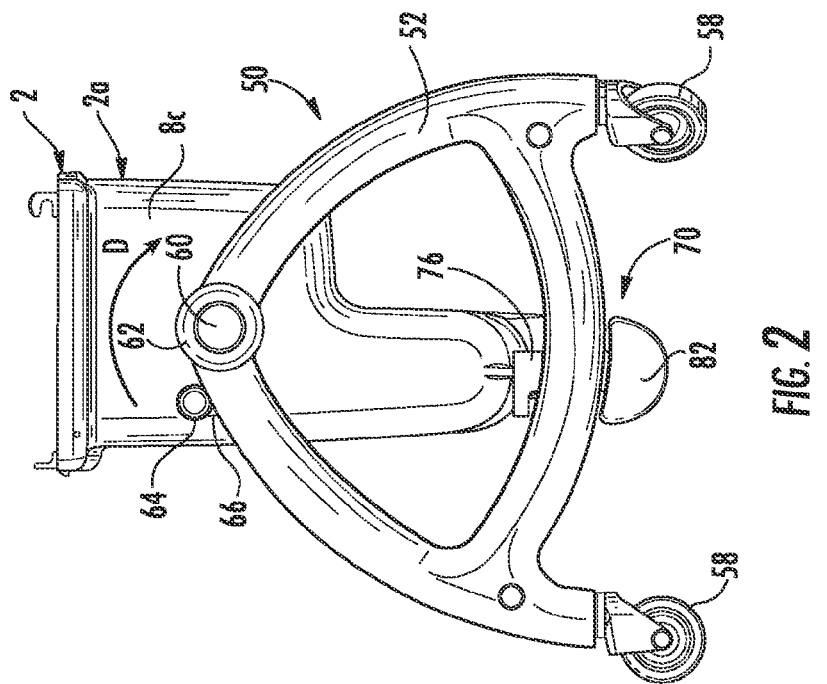

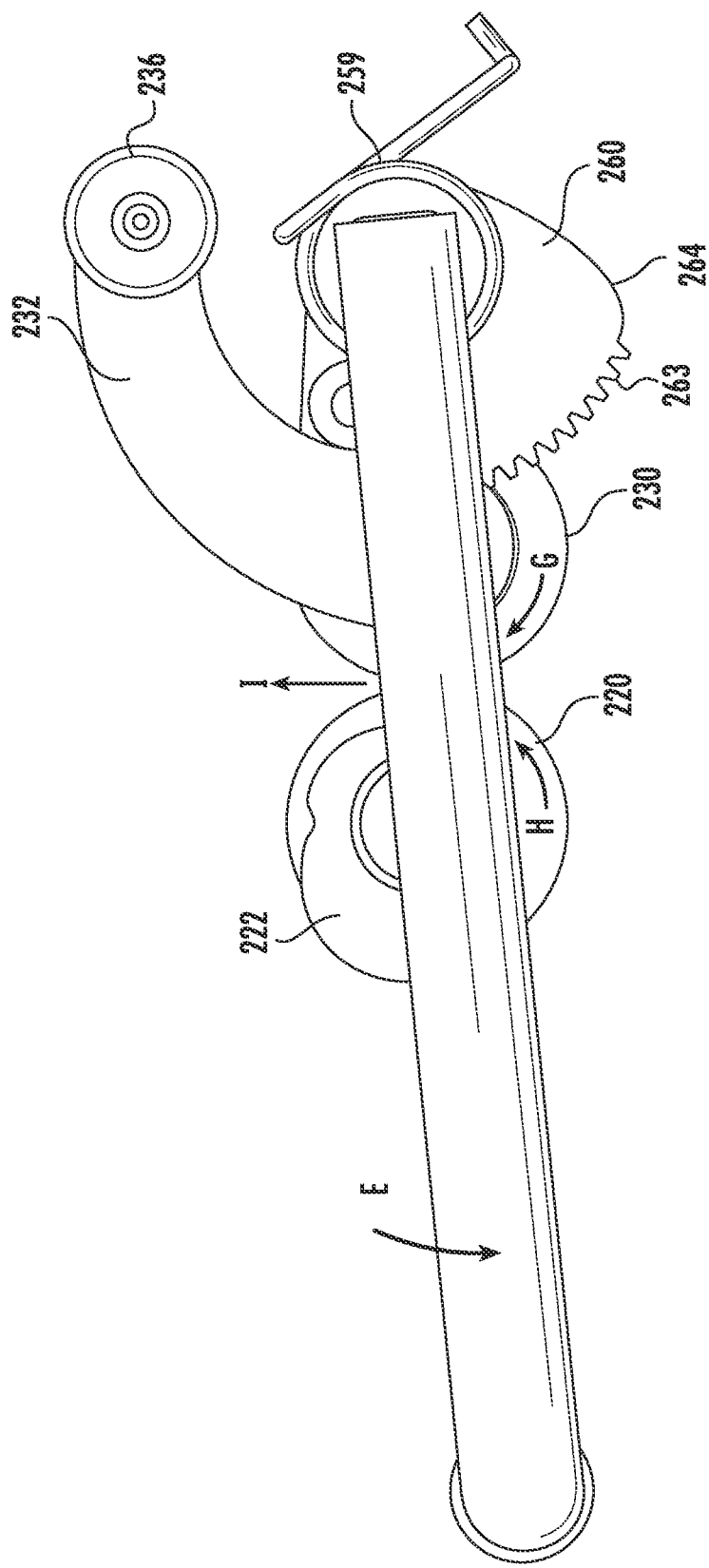

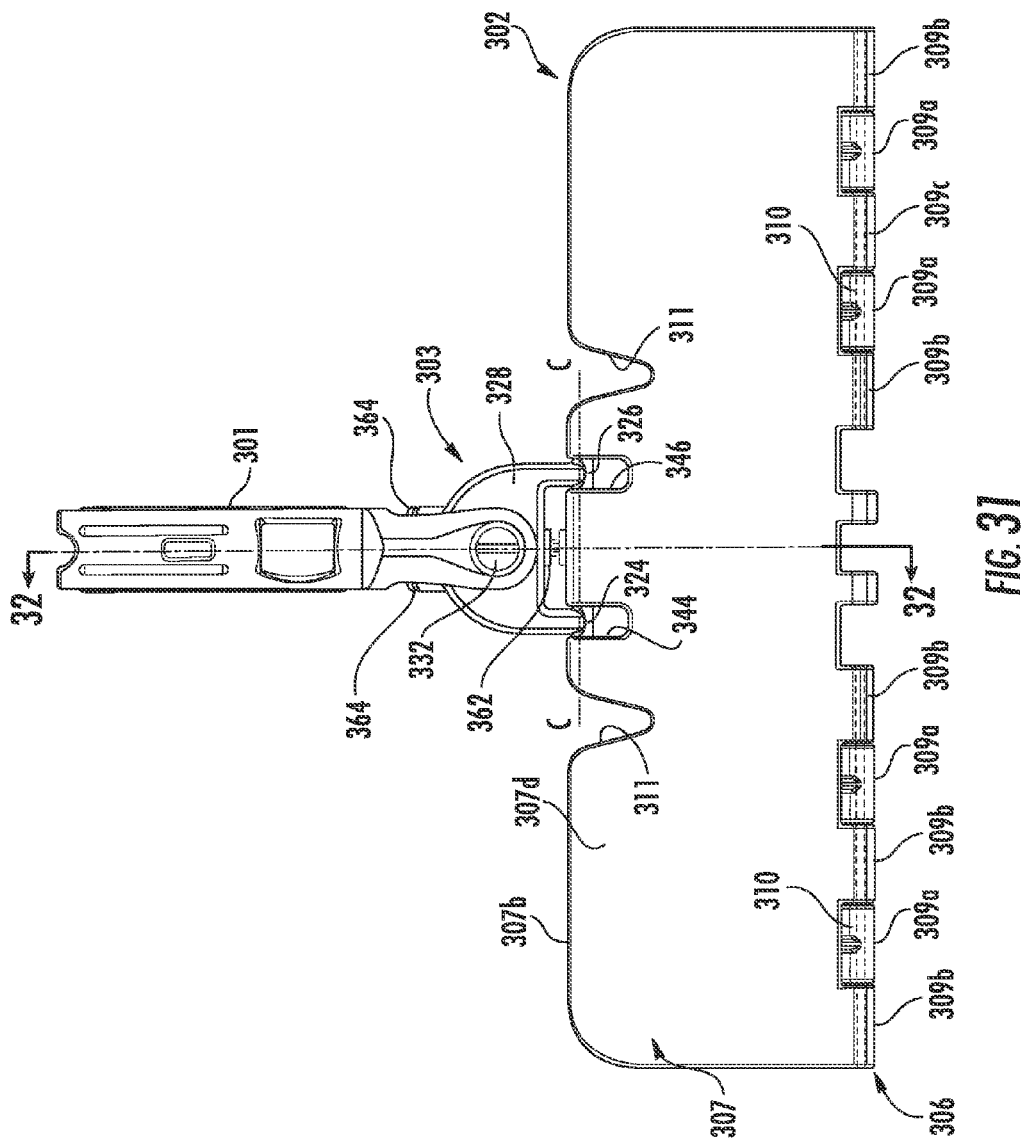
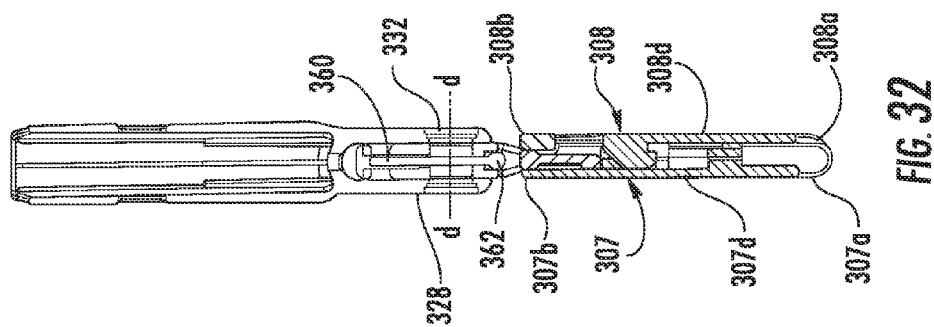

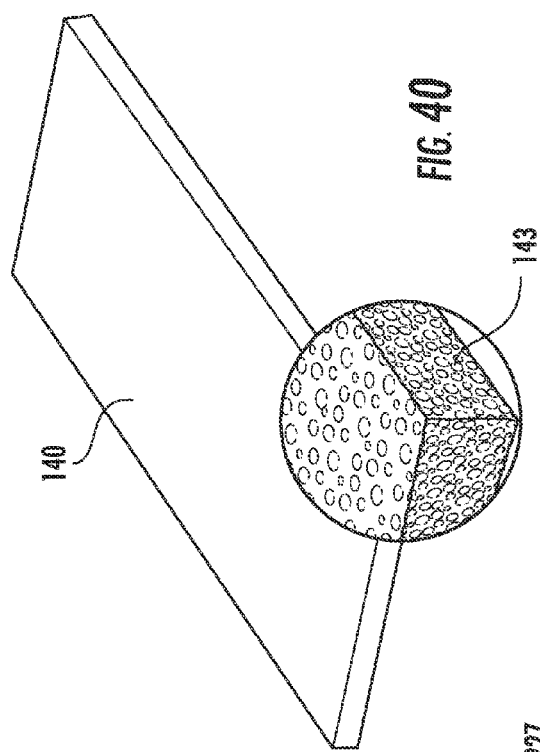
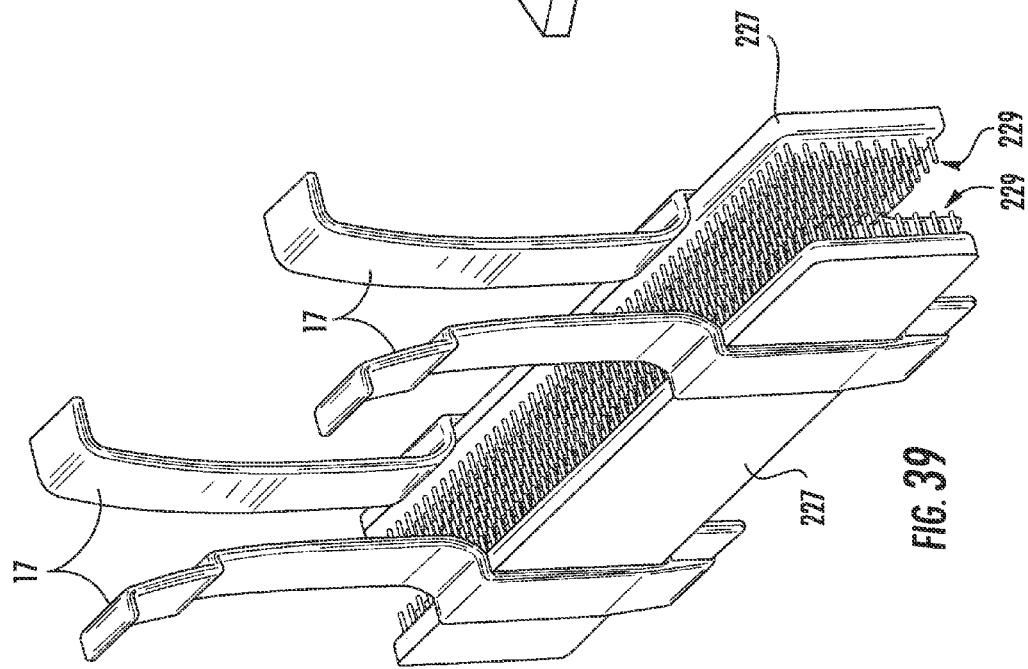

MOP AGITATOR

This application claims benefit of priority under 35 U.S.C. §119(e) to the filing date of to U.S. Provisional Application No. 61/256,508, as filed on Oct. 30, 2009, which is incorporated herein by reference in its entirety, and to the filing date of to U.S. Provisional Application No. 61/308,536, as filed on Feb. 26, 2010, which is incorporated herein by reference in its entirety.

BACKGROUND

Typically when a user uses a mop bucket to clean a floor with a wet mop, the process starts with clean water and detergent mixed in the mop bucket to create a cleaning solution. Each time the user finishes mopping a section of the floor the mop is dipped in the cleaning solution. The excess water and residual dirt may be wrung out of the mop using a wringer. The wrung mop is used to mop the floor.

SUMMARY OF THE INVENTION

A mop bucket comprises an internal compartment defined by a side wall for retaining a liquid. A first bracket is supported in the compartment and supports a first agitator blade and a second bracket supported in the compartment and supports a second agitator blade such that the agitator blades are spaced from one another a distance sufficient to receive a mop. The first agitator blade and the second agitator blade each comprising a plurality of fins extending from a planar support surface. The first agitator blade and said second agitator blade may also comprise a plurality of bristles extending from a planar support surface.

The first agitator blade and the second agitator blade may be supported below a liquid such that a soil from a mop is suspended in the liquid. The first agitator blade and the second agitator blade may be submerged below the surface of a cleaning fluid. The first agitator blade may comprise a first planar support that is connected to and supported by the first bracket and the second agitator blade may comprise a second planar support that is connected to and supported by the second bracket. The first planar support and the second planar support may be disposed generally parallel to one another. The plurality of generally horizontally extending fins may extend from the first planar support and the second planar support. The fins may comprise thin planar members that extend from each of the first planar support and the second planar support. The bottom end of the first bracket and second bracket may each be formed with spaced flanges. The spaced flanges surround a flange extending from the bucket.

A method of using a mop bucket comprises providing a mop bucket having an internal compartment and a first bracket connected to the bucket and supporting a first agitator blade and a second bracket connected to the bucket and supporting a second agitator blade such that the agitator blades are spaced from one another a distance sufficient to receive a mop. The first agitator blade and the second agitator blade are submerged in a liquid. Inserting a mop into the compartment along a second direction with a cleaning surface of the mop disposed between the agitator blades. Reciprocating the mop along the second direction between the agitator blades.

BRIEF DESCRIPTION OF THE DRAWINGS

FIG. 2 is a side view of the bucket of FIG. 1.
FIG. 3 is a front view of the bucket of FIG. 1.
FIGS. 27 through 29 are side views showing the operation of the wringer mechanism of the wringer of FIG. 21.
FIG. 31 is a front view of an embodiment of the mop frame.
FIG. 32 is a section view taken along line 32-32 of FIG. 31.
FIGS. 38 and 39 are perspective views showing alternate embodiments of the agitator.
FIG. 40 is a perspective view showing an alternate embodiment of the filter.

DETAILED DESCRIPTION OF PREFERRED EMBODIMENTS OF THE INVENTION

Figure 1:
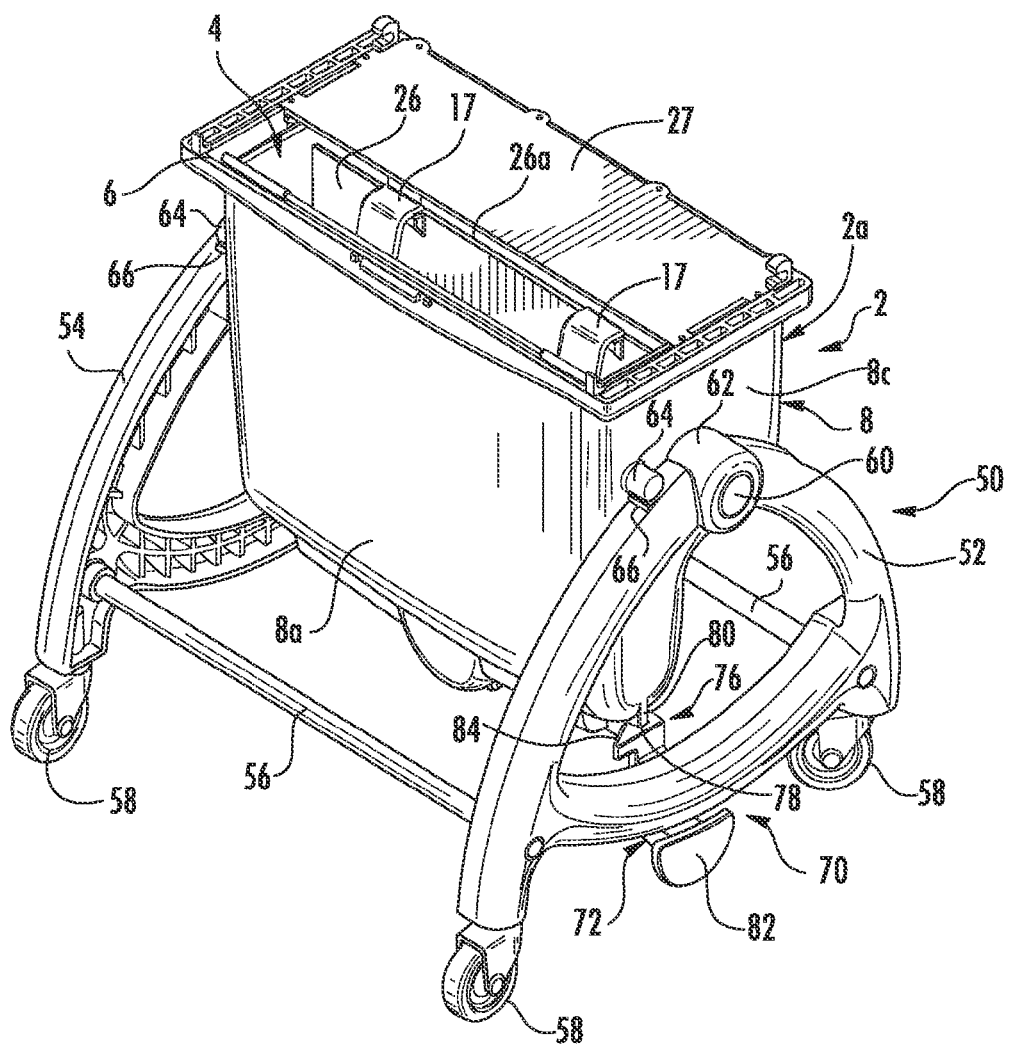
FIG. 1 is a perspective view of an embodiment of a bucket of the invention.

The mopping system comprises embodiments of a mop, frame, handle, bucket, and wringer as disclosed. While the individual components of the system described herein are useful when used together as part of the mopping system, the components may also be used independently from one another. Referring to FIGS. 1 through 5 the mop bucket of the invention 2 comprises a housing 2a defining an interior space 4 that retains the cleaning solution. While a typical cleaning solution comprises water mixed with a detergent, the term "cleaning solution" as used herein includes any liquid used for cleaning including water. The housing 2 has an upstanding side wall 8 with an upwardly facing opening formed by rim 6 at top edge thereof. The illustrated embodiment of the bucket 2 has opposed front and back walls 8a, 8b and opposed side walls 8c, 8d although the bucket may have any suitable shape. The user may access the interior of the bucket 2 through the opening defined by rim 6 to fill the bucket with cleaning solution and to insert the mop into the bucket during use of the bucket.

A wringer 200 is located over opening defined by rim 6 such that the mop may be inserted through the wringer into the interior space 4 of bucket 2. The wringer 200 is shown as having a pair of cooperating rollers 220 and 230 that cooperate to wring cleaning solution and dirt from the mop such that the wrung cleaning solution and dirt falls into the bucket. The rollers 220 and 230 may be actuated by a lever 266 to bring the rollers together to compress the mop and wring the cleaning solution and dirt from the mop. While a specific embodiment of a wringer assembly is shown and described with respect to FIGS. 21 through 30, the wringer 200 used with bucket 2 may have any construction and operation that allows the dirty cleaning solution to be wrung into the bucket as will hereinafter be described.

Figure 8:
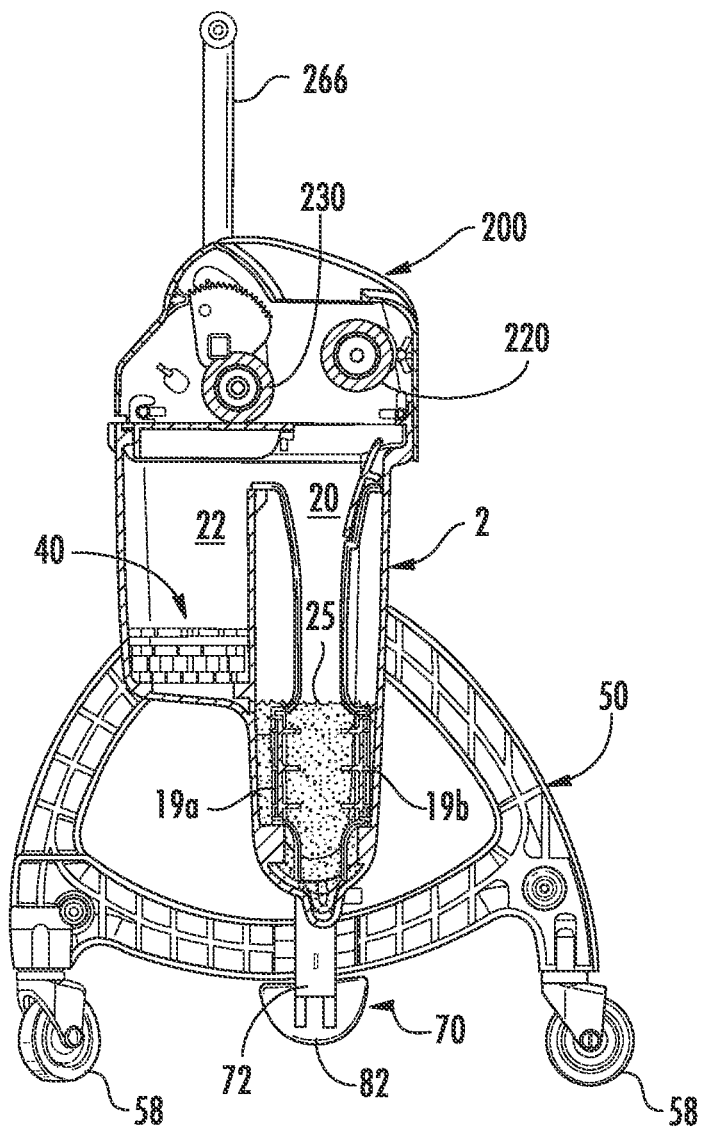
FIGS. 8, 9 and 10 are a section views showing the operation of the bucket of FIG. 1.

The bucket 2 is divided into two internal compartments by internal divider wall 26. The first compartment is a mop compartment 20 and the second compartment is a filter compartment 22. While in the illustrated embodiment the illustrated embodiment the two compartments are formed integrally with one another as part of a single bucket, the filter compartment may be made as a separate unit from the bucket that is detachable from the bucket such that the bucket may be used without the filter compartment 22. In the illustrated embodiment the internal wall 26 extends across the width of interior space 4 and is connected to side walls 8c, 8d of the bucket 2 with the mop compartment 20 disposed along the front of the bucket and the filter compartment 22 disposed along the back of the bucket. The wall 26 is dimensioned such that the top edge 26a of wall 26 is spaced below the rim 6 of the bucket 2. A cover 27 is secured to the rim 6 of bucket 2 over filter compartment 22 to create a liquid tight seal between bucket 2 and cover 27. As a result, when the bucket is rotated to tilted position (as will hereinafter be described), any liquid in the mop compartment 20 will spill over the edge 26a of the wall 26 and drain from the mop compartment 20 to the filter compartment 22 without spilling from the bucket such that a fluid movement path between the mop compartment 20 and the filter compartment 22 is provided as represented by arrow A. An overspill wall 11 pivots about an axis 13, defined by pins 3 that engage holes 5 in sidewalls 8a and 8b between a retracted position when the bucket is in the upright position (shown in FIGS. 5 and 8) to a active position where it overlaps cover 27 when the bucket is in the tilted position (shown in FIGS. 9 and 14). The overspill wall 11 prevents the liquid from splashing over the cover 27 and out of the bucket. The fluid movement path A may comprise tubes, conduits or other passageways, rather than the simple spillway described above, that allow the liquid to drain from the mop compartment 20 to the filter compartment 22.

The bottom 30 of the mop compartment 20 extends below the bottom 32 of the filter compartment 22 such that the bottom 32 of the filter compartment 22 is located at an elevated position relative to the mop compartment 20. The divider wall 26 includes an aperture or a plurality of spaced apertures 34 located adjacent bottom wall 32 such that liquid in filter compartment 22 may drain by gravity through apertures 34 into the mop compartment 20. When the bucket is in the upright position and liquid is in the filter compartment 22 a fluid movement path between the filter compartment 22 and the mop compartment 20 is provided as represented by arrow C that allows the liquid to drain from the filter compartment 22 to the mop compartment 20. The fluid movement path comprises the apertures 34 and the angled bottom wall 32 that drains liquid to the apertures 34. The fluid movement path may comprise tubes, conduits or other passageways that allow the fluid to drain from the filter compartment 22 to the mop compartment 20. The capacity of the mop compartment 20 below the apertures 34 is approximately the same or slightly less than the capacity of the filter compartment 22 such that the volume of cleaning solution in the mop compartment 20 may be contained in the filter compartment 22.

Figure 15:
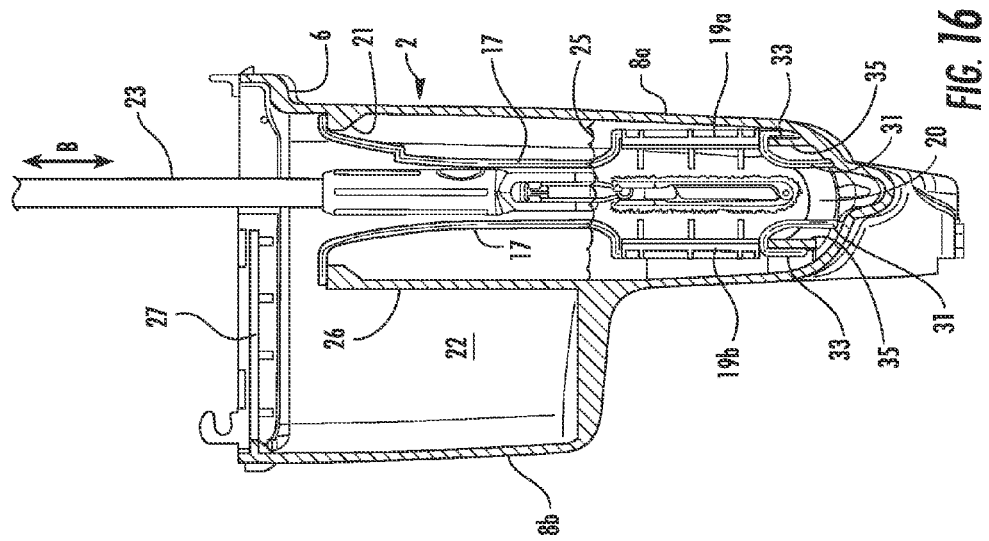
FIGS. 15 and 16 are a section views showing an embodiment and operation of the mop agitator.
Figure 16:
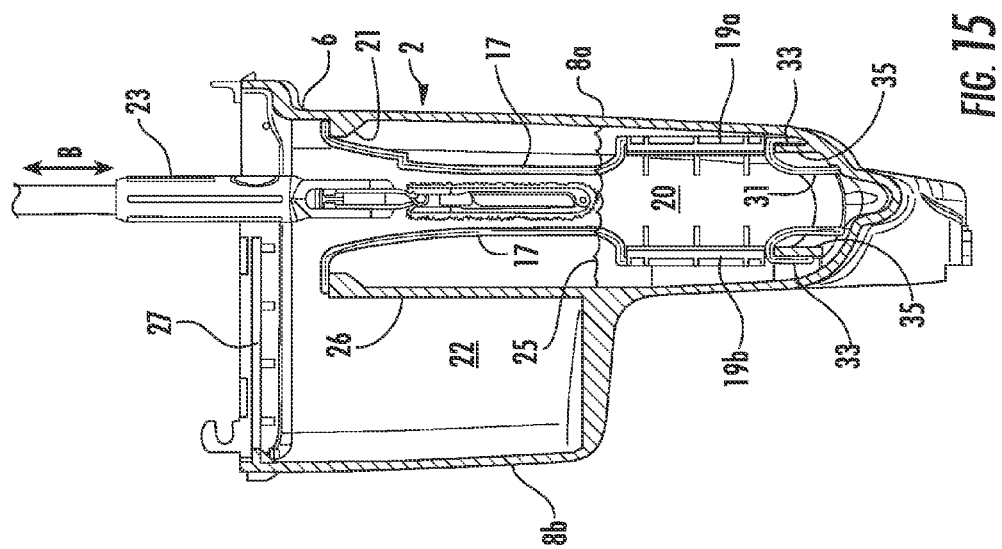
Figure 17:
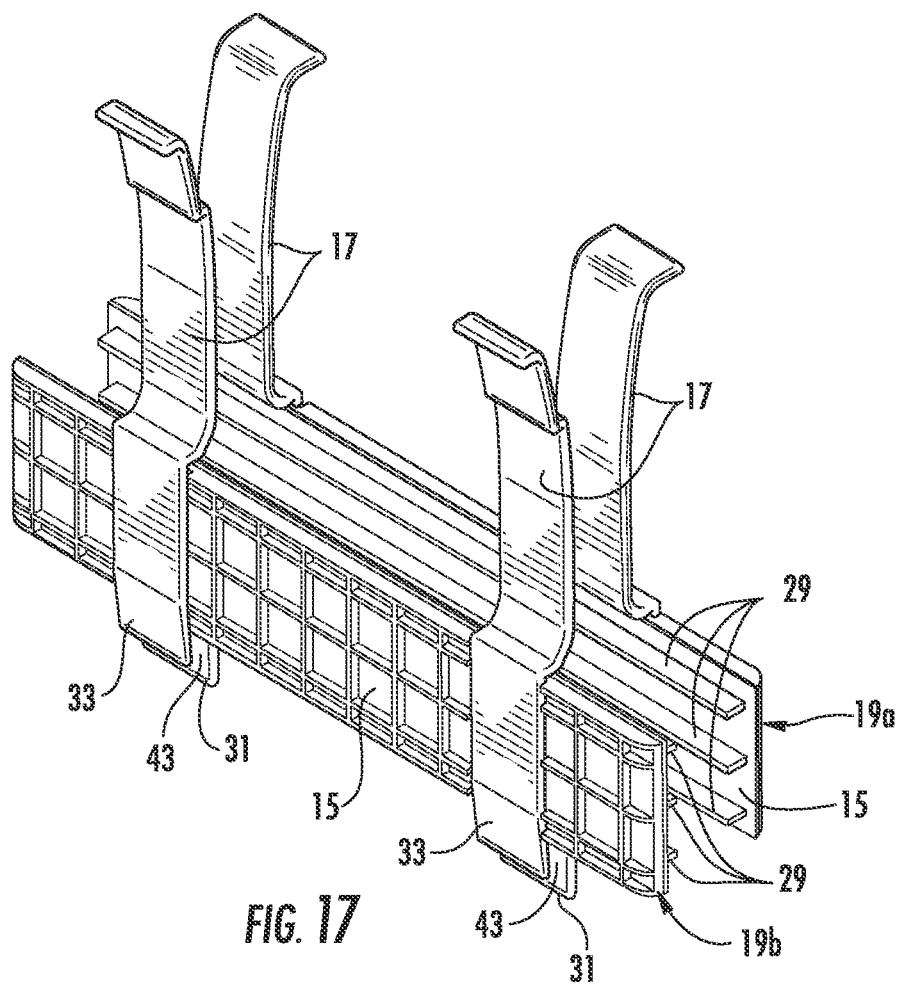
FIG. 17 is a detailed perspective view of the agitator of FIGS. 15 and 16.
Figure 18:
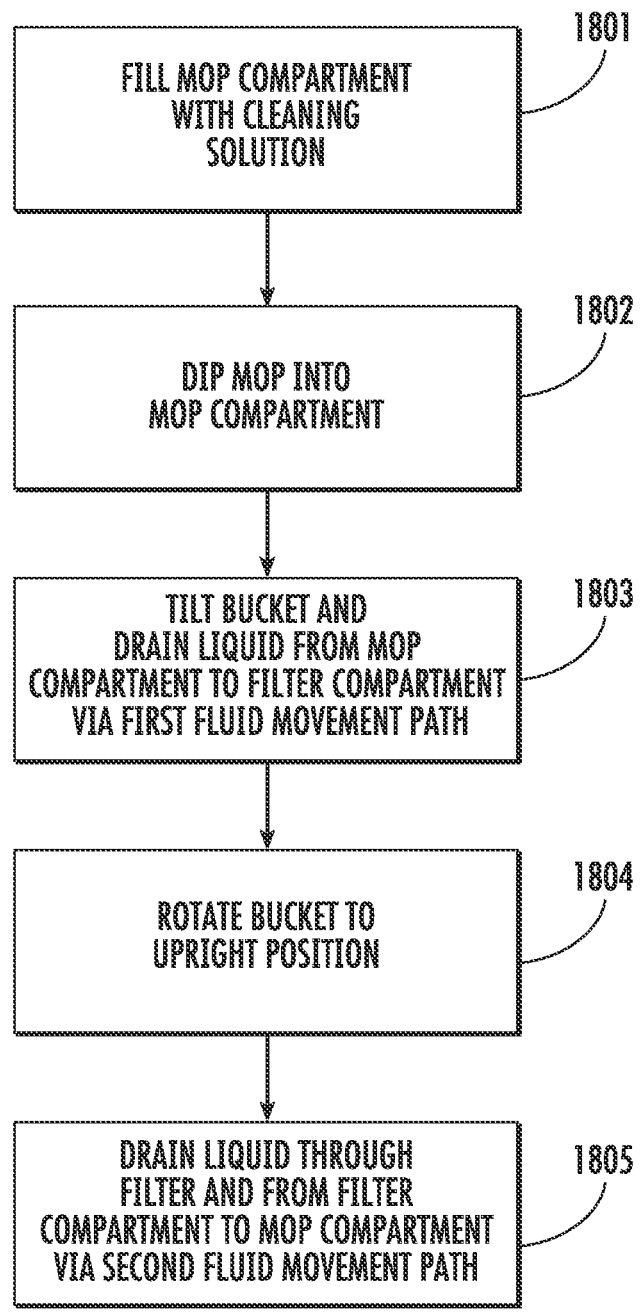
FIG. 18 is a block diagram showing the operation of the bucket of FIGS. 5 and 11.
Figure 19:
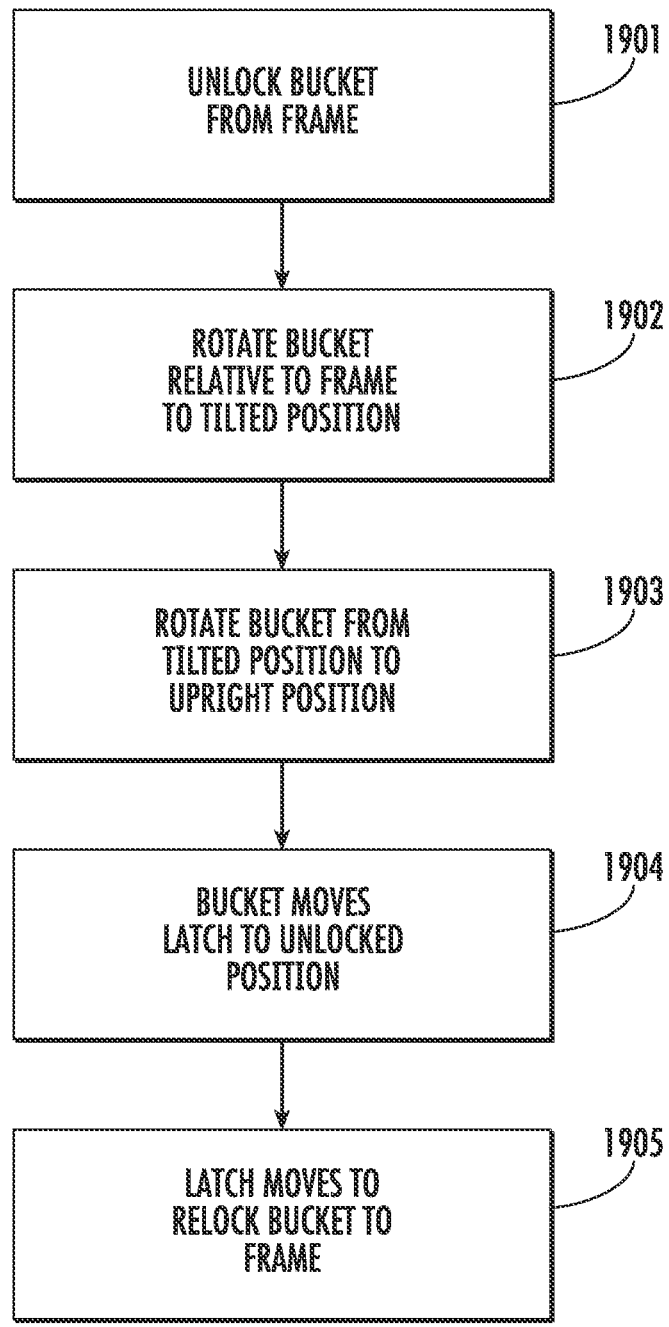
FIG. 19 is a block diagram showing the operation of the bucket of FIGS. 1 through 5.
Figure 20:
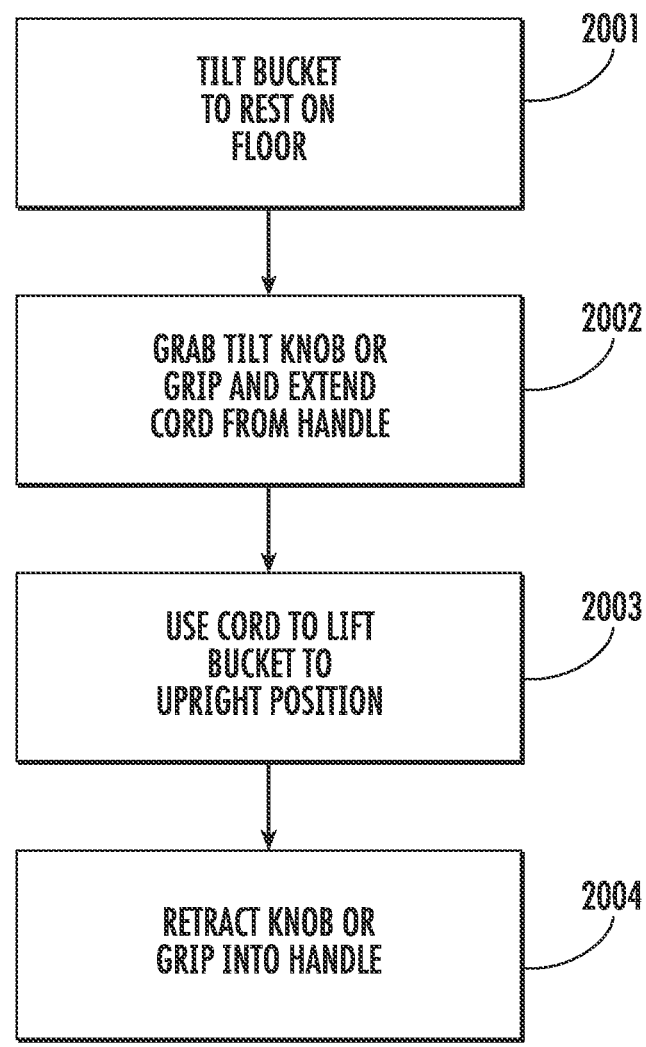
FIG. 20 is a block diagram showing the operation of the bucket of FIGS. 11 through 14.
Figure 21:
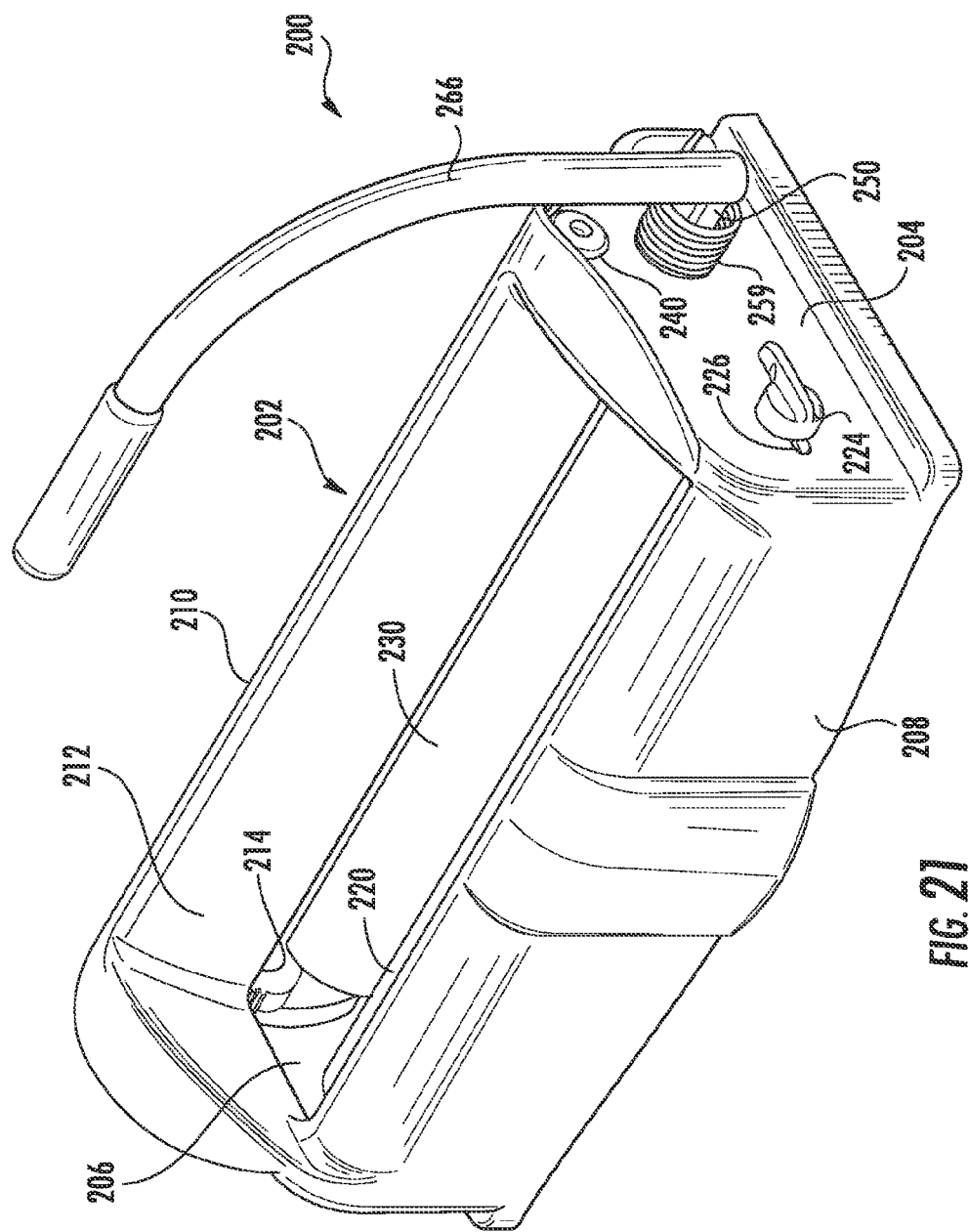
FIG. 21 is a perspective view of an embodiment of the wringer.

A mop 23 is inserted into the mop compartment 20 during use of the bucket as shown in FIGS. 15 and 16. If a wringer is used, the wringer is positioned such that liquid and dirt wrung from the mop enters mop compartment 20. Referring to FIGS. 15 through 17, agitator brackets 17 supporting agitator blades 19a and 19b may be provided in compartment 20 to scrub the cleaning surfaces of the mop 23 and release the dirt off of the mop and into the cleaning solution. Two of the brackets 17 are connected to supports 21 formed on the inside of wall 8a such that they extend into the mop compartment 22 and support blade 19a along the front wall. Two other agitator brackets are connected to the top edge of the divider wall 26 such that they extend into the mop compartment and support blade 19b along the divider wall 26. The brackets 17 may be supported other than as shown provided the agitator blades 19a, 19b extend into the compartment containing cleaning fluid and are disposed opposite to and face one another. Agitator blades 19a and 19b are submerged below the surface of the cleaning fluid 25 and are spaced such that a mop 23 may be inserted into mop compartment 20 with the cleaning surfaces of the mop disposed in the cleaning solution between the agitator blades 19a and 19b. Each agitator blade 19a, 19b comprises a planar support 15 that is connected to and supported by the brackets 17 and are disposed generally parallel to one another. Extending from the support 15 are a plurality of generally horizontally extending fins 29. The fins 29 comprise thin planar members that extend from support 15 for substantially the width of the support 15. The supports 15 and fins 29 may be formed of molded plastic, rubber or other similar material. The bottoms ends of brackets 17 are formed with flanges 31 and 33 that define a space 43 therebetween. The flanges 29 and 31 surround flanges 35 that extend upwardly from the bottom of the bucket 2 such that the flanges are located in spaces 43. The engagement of the flanges 35 with flanges 31 and 33 fixes the lower ends of the brackets 17 relative to the bucket. Mop 23 can be reciprocated up and down in mop compartment 20 along a first direction B that is transverse to the direction that the fins 29 extend such that the agitator blades 19 contact the mop surface and clean dirt and debris from the mop. The agitator blades 19 also create turbulence in the cleaning solution that also frees dirt and debris from the mop.

Figure 38:
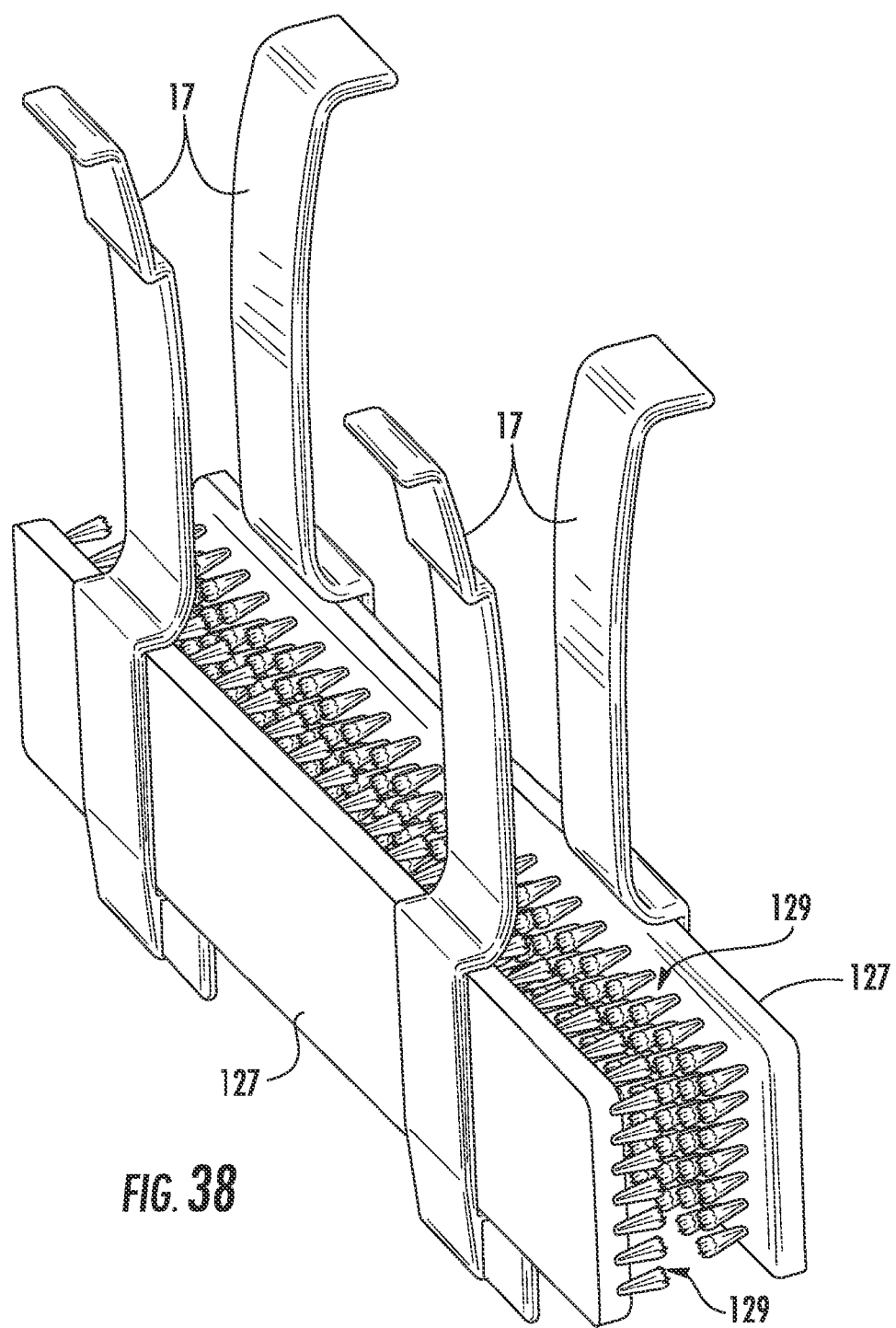

An alternate embodiment of the agitator blades 119a, 119b is shown in FIG. 38 and comprises a planar support 127 that is connected to and supported by the brackets 17 and are disposed generally parallel to one another. Extending from the support 127 are a plurality of bristles 129. The bristles 129 may comprise monofilament bristles that extend from support 127 over substantially the entire surface area of the support 127. Referring to FIG. 39, the bristles may also comprise molded rubber bristles 229 that extend from support 227 over substantially the entire surface area of the support as shown in FIG. 39. The agitator blades are spaced from one another a distance sufficient to allow a mop to be inserted between the agitator blades such that the mop 23 can be reciprocated up and down along a first direction that is transverse to the direction that the bristles 129, 229 extend such that the bristles contact the mop surface and clean dirt and debris from the mop.

Figure 4:
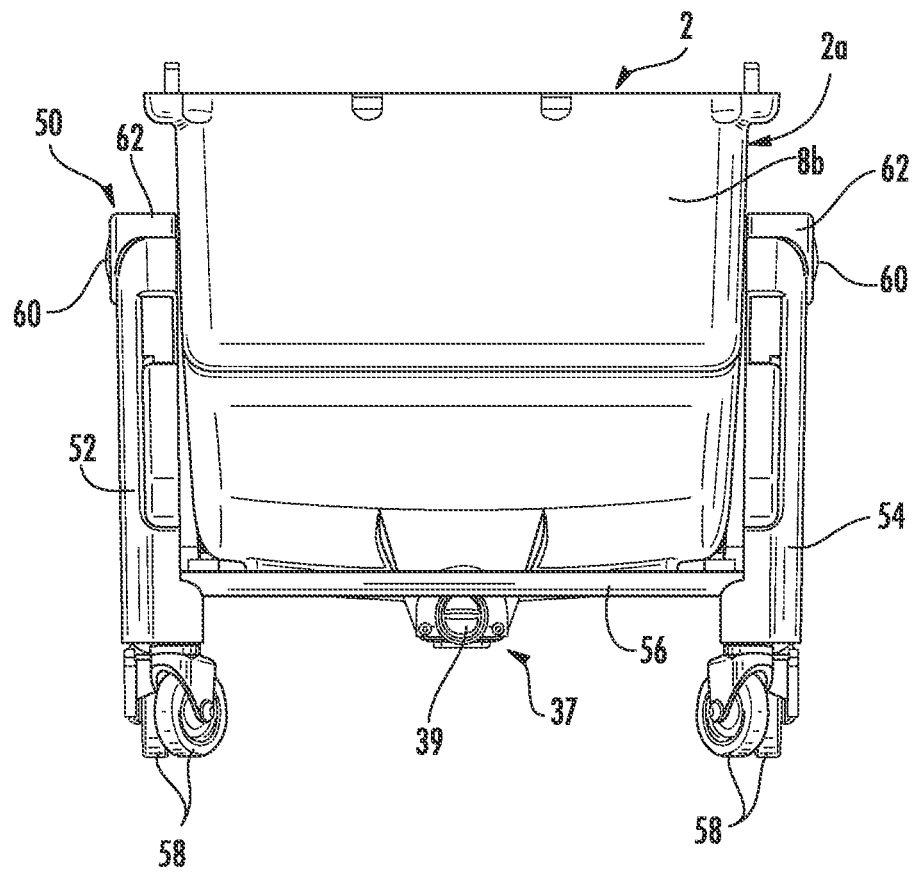
FIG. 4 is a back view of the bucket of FIG. 1.

Referring to FIGS. 3 and 4, a drain 37 may be provided in the bottom of the compartment 20 such that the cleaning solution may be easily drained from bucket 2. The drain 37 may comprise a threaded drain plug 39 that engages a mating threaded hole on the bucket 2.

Figures 6, 7:
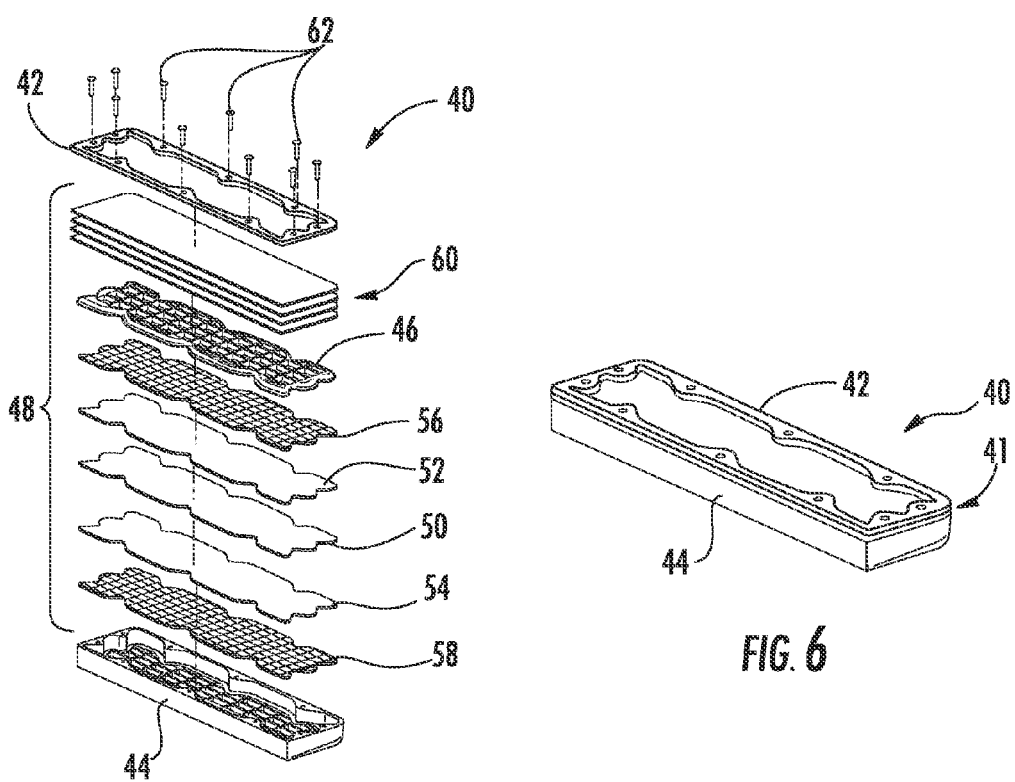
FIG. 6 is a perspective view of an embodiment of a filter of the invention.
FIG. 7 is an exploded perspective view of the filter of FIG. 6.

A filter 40 is shown in FIGS. 6 and 7 that comprises a frame 41 comprising a top ring 42 and bottom grid 44. A filtering element 48 is located in the frame 41 such that liquid may flow into filter 40 through top ring 42 and through the filtering element 48 and out of the bottom grid 44. The filtering element 48 may comprise any suitable filter that can remove particles, dirt and debris from the cleaning solution. In one embodiment the filtering element 48 comprises a layer of sand 50. The layer of sand 50 may comprise a 0.25" thick layer of fine grain sand. Above and below the layer of sand 50 are layers of retaining cloth 52, 54, respectively, such as 5 micron cloth. Above and below the layers of retaining cloth 52 and 54 are layers of wire mesh 56 and 58, respectively, such as 0.25" wire mesh. An upper grid 46 is located above the wire mesh layer 56 and four layers of 5 micron cloth 60 may be located above upper grid 46. The bottom grid 44 is secured to the top ring 42 by a plurality of screws or other fasteners 62 to sandwich the layers together. The top ring 42 and four layers of cloth 60 form a pre filter. The top ring 42 and four layers of cloth 60 may be eliminated and the upper grid 46 secured to the bottom grid 44 by fasteners 62 such that the upper grid 46 forms the inlet to the filter. The sand layer 50 is maintained in a uniform thickness and in a flat orientation to create an effective water filter. The water is able to freely flow through all of these components. To ensure that all of the liquid flows through the filter elements a liquid tight seal is made between each of the filter elements and the inside wall of bottom grid 44. Referring to FIG. 40 an alternate embodiment of the filter may comprise a cast ceramic or porous plastic filter 140 that comprises a solid body having a plurality of voids 143 formed therein that allow the cleaning fluid to flow through the filter while trapping dirt and debris in the voids.

Figure 5:
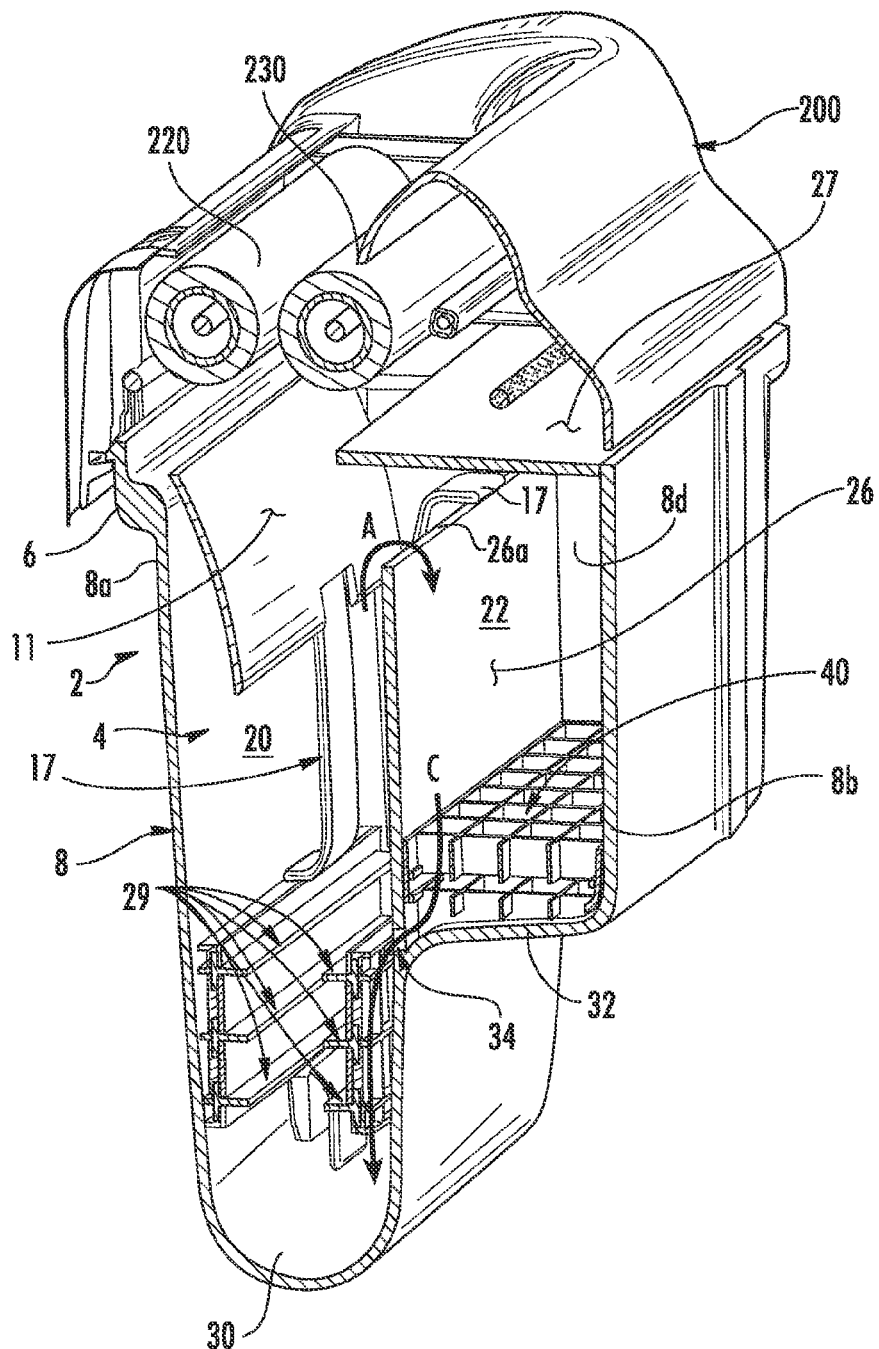
FIG. 5 is a section perspective view of the bucket of FIG. 1.

Referring to FIG. 5, the filter 40 is located at the bottom of the filter compartment 22 and is dimensioned to completely fill the filter compartment such that any liquid in the filter compartment 22 flows through the filter 40 to apertures 34 along fluid movement path C. A liquid tight seal is provided between the filter 40 and bucket 2 to ensure that all of the liquid flows through the filter. While the filter 40 is shown at the bottom of the filter compartment 22 the filter may be located at a different position provided the cleaning solution flows through the filter. For example the filter may be centrally located in filter compartment 22 or it may be located in the fluid movement path A between the mop compartment 20 and filter compartment 22, for example, in the spill way defined by the top edge 26a of wall 26 and cover 27. Moreover, the filter is a self contained unit that is removable from the bucket 2 such that the filter can be removed and cleaned and replaced in the bucket.

Figure 9:
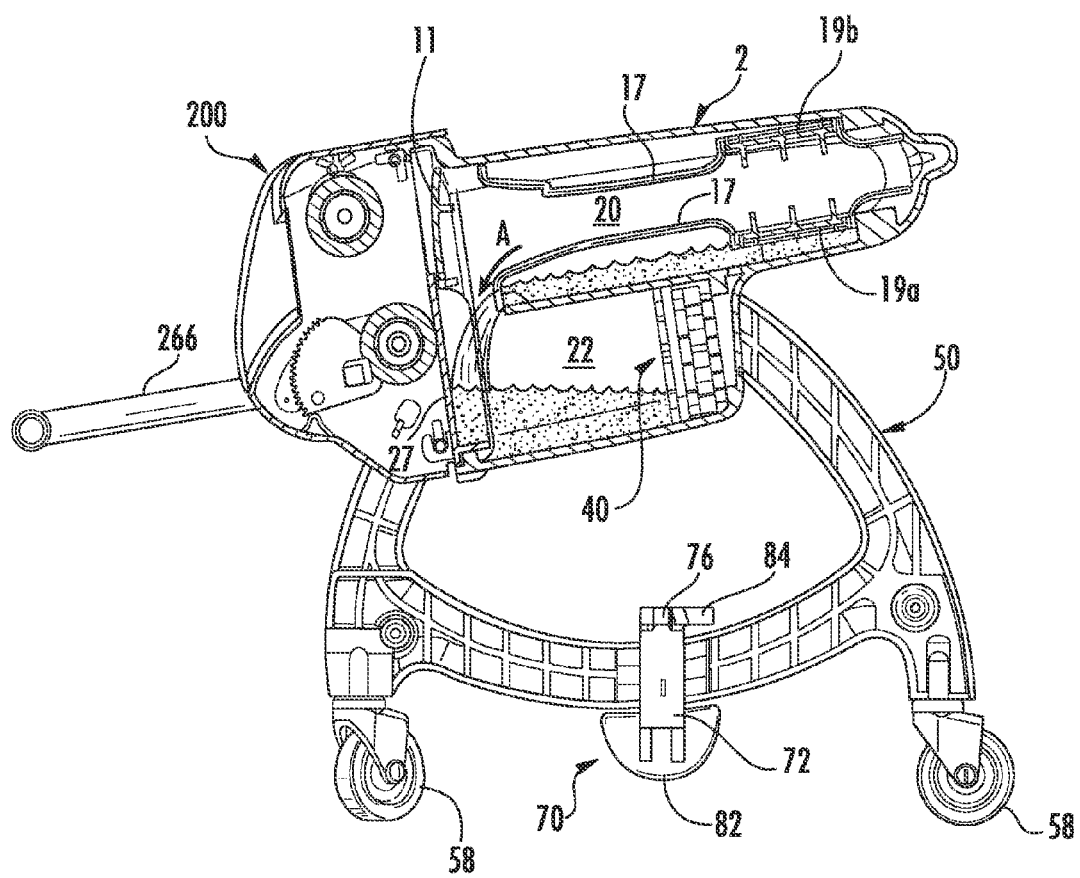
Figure 10:
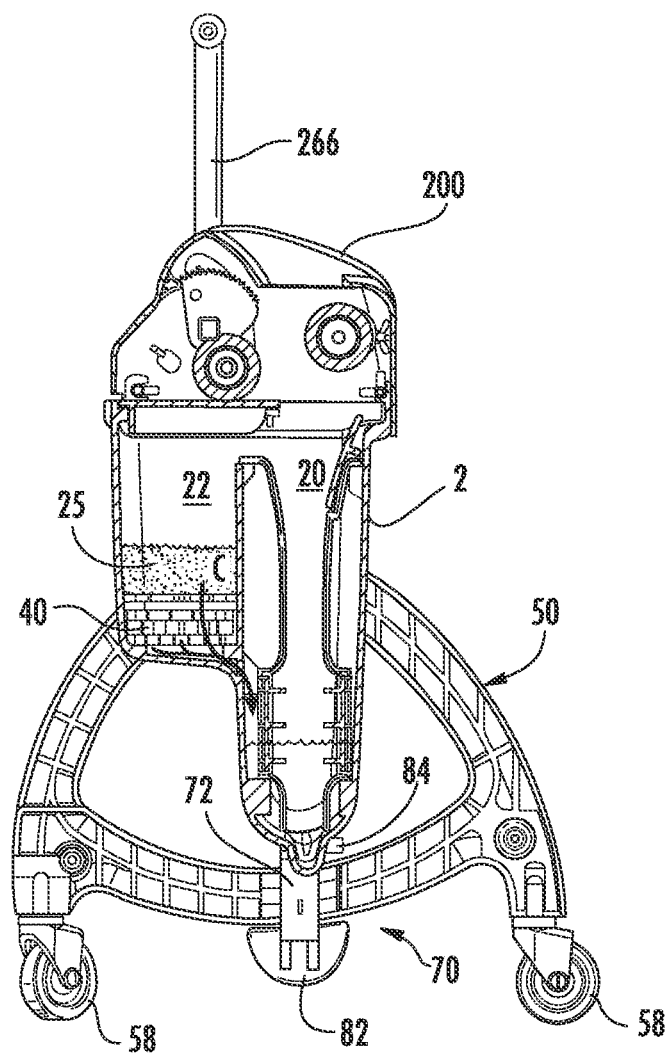
Figure 11:
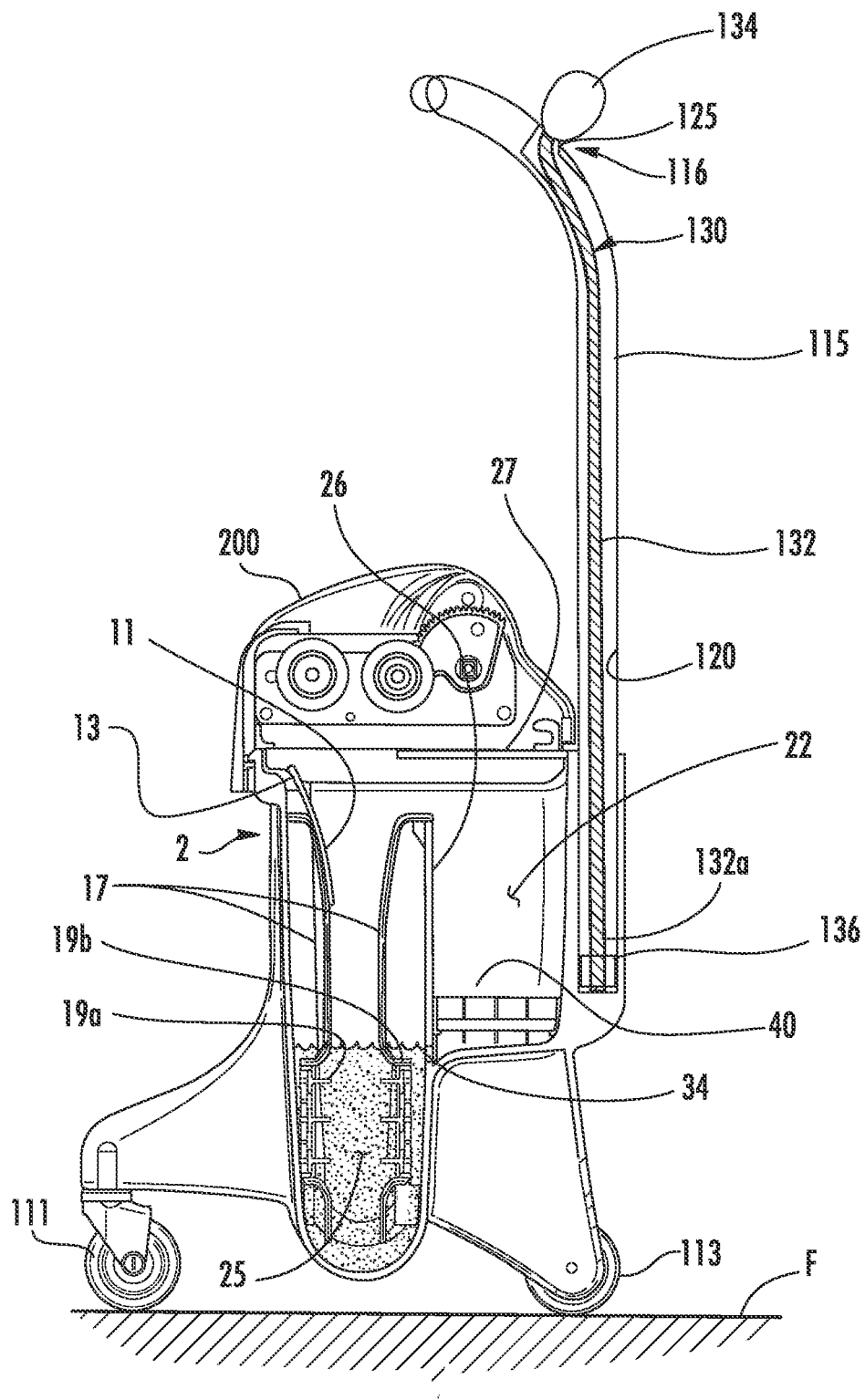
FIGS. 11, 12 and 13 are section views showing the operation of an alternative embodiment of the bucket of the invention.

Referring to FIGS. 1 through 4, the bucket 2 is supported on a frame 50 such that the bucket 2 may be pivoted between an upright position, shown in FIGS. 1 through 5, to a tilted position, shown in FIG. 9. In the illustrated embodiment, in the upright position the bucket is disposed substantially vertically and the bucket is rotated approximately 90° to a tilted position that is just past horizontal such that wall 26 is inclined slightly downward from the bottom 30 toward fluid movement path A. The frame 50 comprises a first side member 52 connected to a second side member 54 by cross members 56 to create a rigid support structure that supports bucket 2 between side members 52, 54. The frame 50 is supported on swivel wheels 58 such that the frame 50 and bucket 2 may be transported over a floor or other surface by rolling wheels 58.

Extending from each of side walls 8c and 8d are axles 60 that define a horizontal pivot axis a-a for the bucket 2. The axles 60 are supported in bearings 62 that allow the bucket 2 to pivot relative to the frame 50 such that the bucket may be rotated approximately 90° between the upright position of FIG. 1 and the tilted position of FIG. 9. In the upright mopping position, stops 64 extend from side walls 8c, 8d. Stops 64 engage abutments 66 formed on frame 50 when the bucket 2 is in the upright position to stop the bucket in the upright orientation. A lock 70 locks the bucket in the upright position to prevent the bucket from inadvertently tilting during use of the mop bucket. The lock 70 comprises a latch 72 that is pivotably mounted on pin 74 to the frame 50 such that it can pivot toward and away from the bucket 2. The latch 72 includes an engagement portion 76 at one end and a pedal 82 at the opposite end that can be depressed by the user to unlock the latch. The engagement portion 78 of latch 72 engages a portion of the bucket such that the bucket cannot pivot relative to the latch when the latch is in the engaged, locked position. In the illustrated embodiment the engagement portion 76 comprises a slot 78 that is engaged by a flange 80 on bucket 2. A spring (not shown) biases the latch 72 to the illustrated locked position. To release the latch 72 the user pushes on pedal 82 to pivot latch 72 about pin 74 such that the engagement portion 76 is rotated away from the bucket and the latch releases flange 80. Once the lock is released the user may manually pivot the bucket to the tilted position about axis a-a in the direction of arrow D. The latch includes a cam surface 84 that is disposed such that when the bucket 2 is rotated from the tilted position back to the upright position (in the direction opposite to arrow D) the flange 80 strikes cam surface 84 to move the latch 72 to the release position. Once the flange 80 becomes aligned with the slot 78 the spring rotates the latch 72 back to the locked position where engagement portion 76 is locked on bucket 2. The pedal 82 is shown located at the bottom of the frame 50 such that it may be operated by the user's foot; however, the pedal could be located elsewhere on the frame and may include an upstanding lever such that it may be conveniently hand operated.

Referring to FIGS. 8, 9, 10 and 18 the operation of the bucket will be described. During a typical procedure for mopping a floor the user fills mop compartment 20 with clean cleaning solution 23 (block 1801). The cleaning solution is filled to approximately the drain apertures 34 such that cleaning solution in compartment 20 fills but will not overflow the filter compartment 22 during use of the bucket.

The user dips the mop through wringer assembly 200 and into compartment 20 (block 1802). The mop may be scrubbed by agitator blades 19a, 19b to release the dirt off of the mop into the cleaning solution 25. The user removes the mop from compartment 20 and may use wringer 200 to wring excess dirt and cleaning solution from the mop into the cleaning solution in compartment 20. After the user has dipped the mop into the cleaning solution in compartment 20 multiple times the dirty cleaning solution may be filtered clean. To filter and clean the cleaning solution 25, the bucket 2 is pivoted from the upright position of FIG. 8 to the tilted position of FIG. 9 until the mop compartment 20 is disposed over the filter compartment 22 and the cleaning solution is able to drain from the mop compartment 20 to the filter compartment 22 via the first fluid movement path A (block 1803). While the bucket is described as rotating slightly greater than 90°, the bucket is rotated a sufficient distance to drain the cleaning solution from mop compartment 20 to filter compartment 22 and this distance may be less than 90°. For example, wall 26 may angled such that mop compartment 20 may be drained without the bucket 2 being rotated 90°. As the bucket 2 is tilted, the dirty cleaning solution drains over the dividing wall 26 from compartment 20 into the filtering compartment 22. The cover 27 and overspill wall 11 prevent the dirty cleaning solution from spilling out of the top of the bucket 2. Once all of the dirty cleaning solution has drained into the filtering compartment 22 the user rotates the bucket back to the upright position shown in FIG. 10 (block 1804). At this point all of the dirty cleaning solution 25 is located in the filtering compartment 22. Gravity pulls the dirty cleaning solution through the filter assembly 40 as the filtered cleaning solution follows the second fluid movement path C and drains through apertures 34 and back into compartment 20 (block 1805).

To rotate the bucket 2, the lock 70 is unlocked by moving latch 72 away from the bucket 2 to disengage the engagement portion 76 from the bucket (block 1901). The user rotates the bucket 2 relative to frame 50 from the upright position of FIG. 8 to the tilted position of FIG. 9 allowing the cleaning solution to drain from compartment 20 to compartment 22 (block 1902). To complete the cleaning cycle, the user rotates the bucket 2 relative to frame 50 from the tilted position of FIG. 9 back to the upright position of FIG. 10 (block 1903). The flange 80 strikes the cam surface 84 of latch 72 to move the latch to the unlocked position (block 1904). The bucket 2 is rotated until the flange 80 is aligned with the engagement portion 76 and the latch 72 moves to relock the bucket relative to the frame 50 (block 1905).

Figure 12:
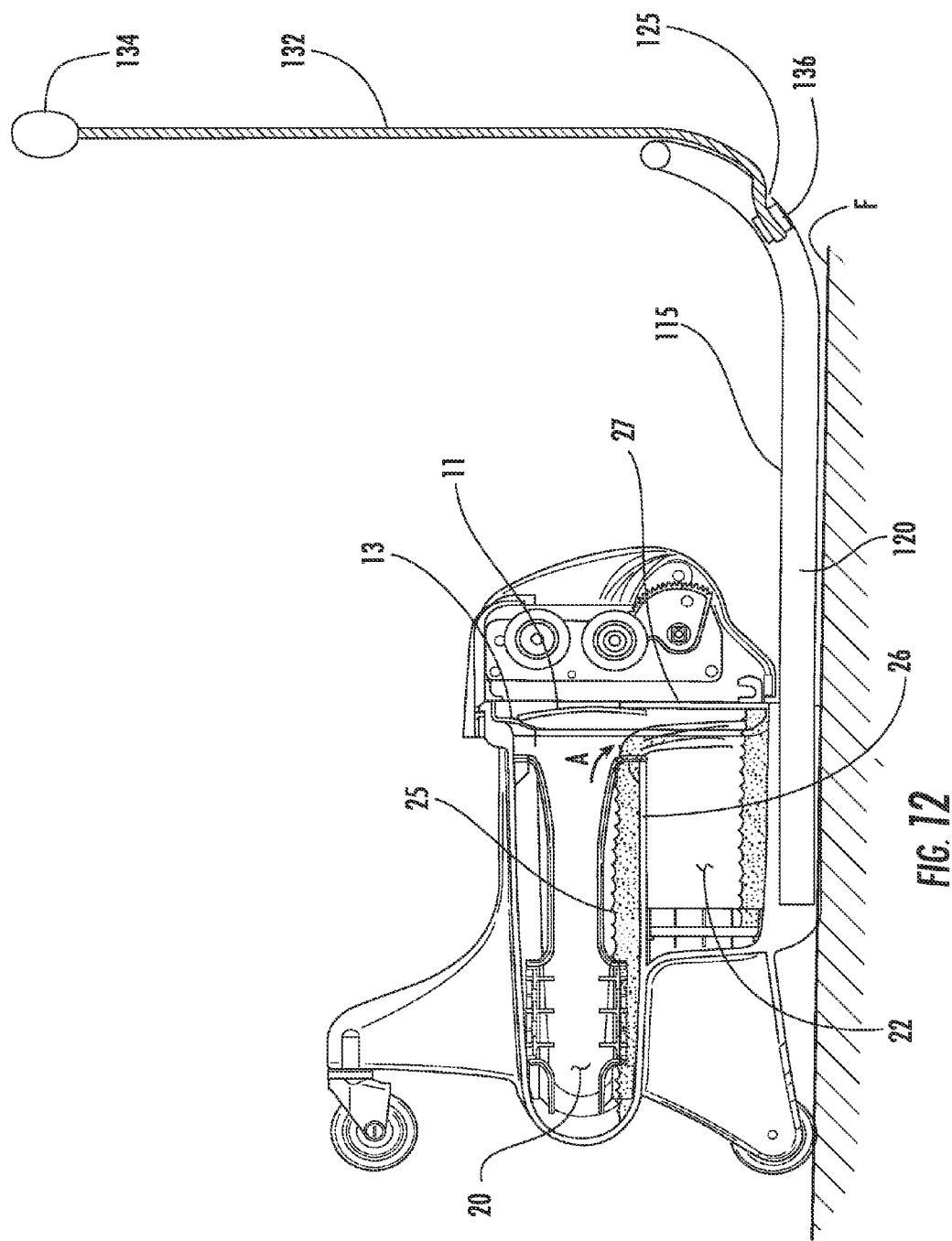

Another embodiment is shown in FIGS. 11 through 14, where like reference numerals are used to identify like elements previously described with reference to FIGS. 1 through 5. The bucket 2 is supported directly on wheels, rather than on frame 50, such that the bucket may be transported by the user over a floor or other surface. In the illustrated embodiment wheels 111 are caster wheels that are free to pivot about a vertical axis while wheels 113 are fixed wheels that cannot rotate about a vertical axis although four caster wheels may be used. A handle 115 extends vertically upward from the bucket 2 such that it can grasped by a user to move the bucket 2. The handle 115 has an internal chamber 120 that extends from the end of the handle near the bucket 2 to a point 116 near the upper free end of the handle 115. The chamber 120 extends to the exterior of the handle 115 at opening 125. A tilting mechanism 130 is disposed in the chamber 120 to facilitate tilting of the bucket. The tilting mechanism 130 comprises a cord 132 that extends in chamber 120 for approximately the length of handle 115 and through opening 125. A tilt knob or grip 134 is secured to the end of the cord 132 that may be easily gripped by the user. The tilt knob or grip 134 is larger than the opening 125 such that the knob cannot be pulled into the chamber 120. In the upright position shown in FIG. 11 the tilting mechanism 130 is stored with the cord 132 retracted into the chamber 120 and the tilt knob or grip 134 pulled against the handle 115 near its free upper end. The user may pull on knob or grip 134 to extend the cord 132 from the handle 115 as shown in FIG. 12. The cord 132 has an enlarged end 136 that is larger than the opening 135 such that the cord 132 may be extended from the handle 115 but cannot be completely removed from the chamber 120. The enlarged end 136 may be weighted such that when the bucket is in the upright position shown in FIG. 11, the weight of the end 136 pulls the end 132a of the cord 132 to the bottom of the chamber 120 thereby retracting the cord into the handle 115 to the retracted position shown in FIG. 11. The extension and retraction of the cord 132 may be accomplished using other mechanisms such as a spool and spring motor or the like.

Figure 13:
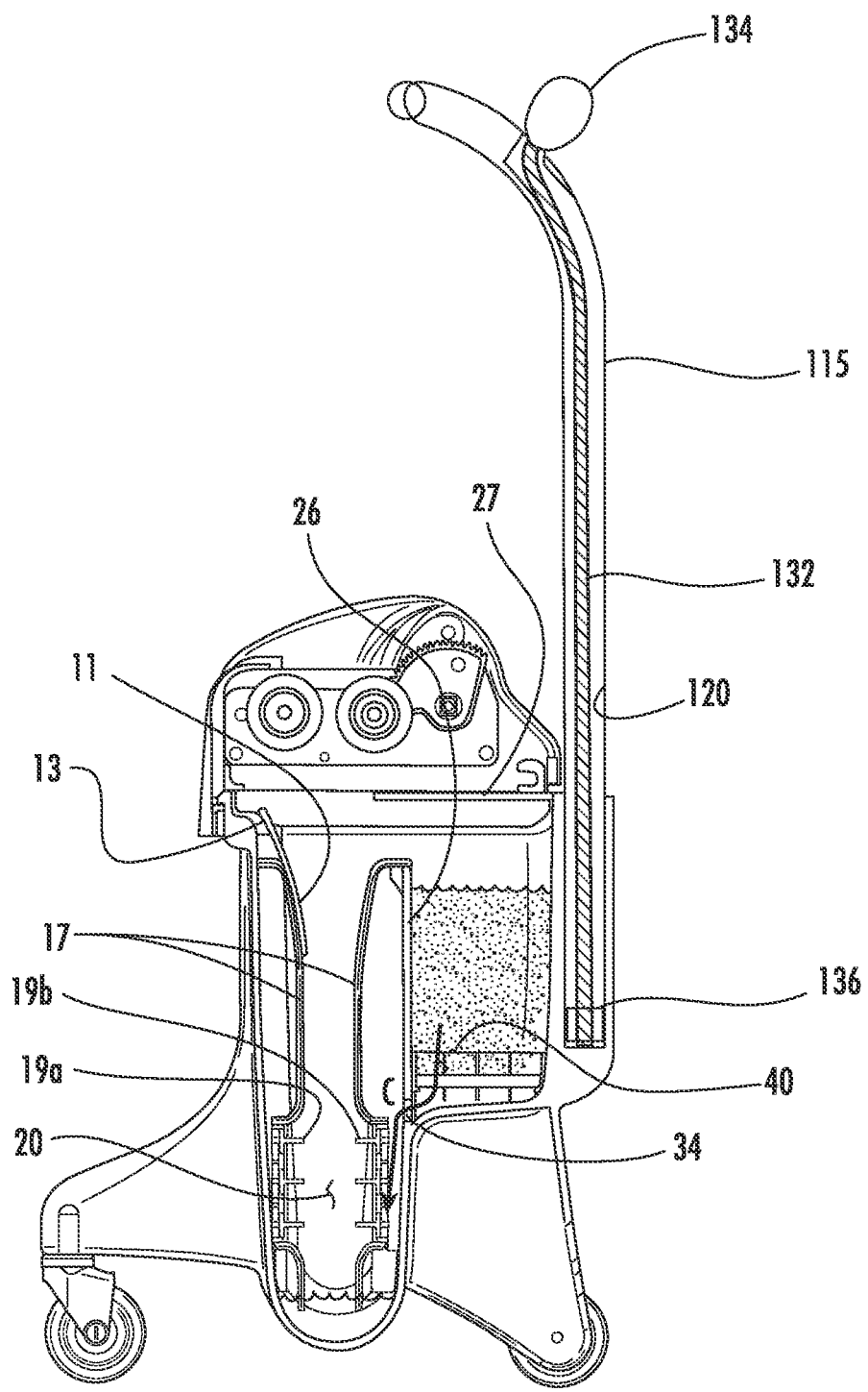
Figure 14:
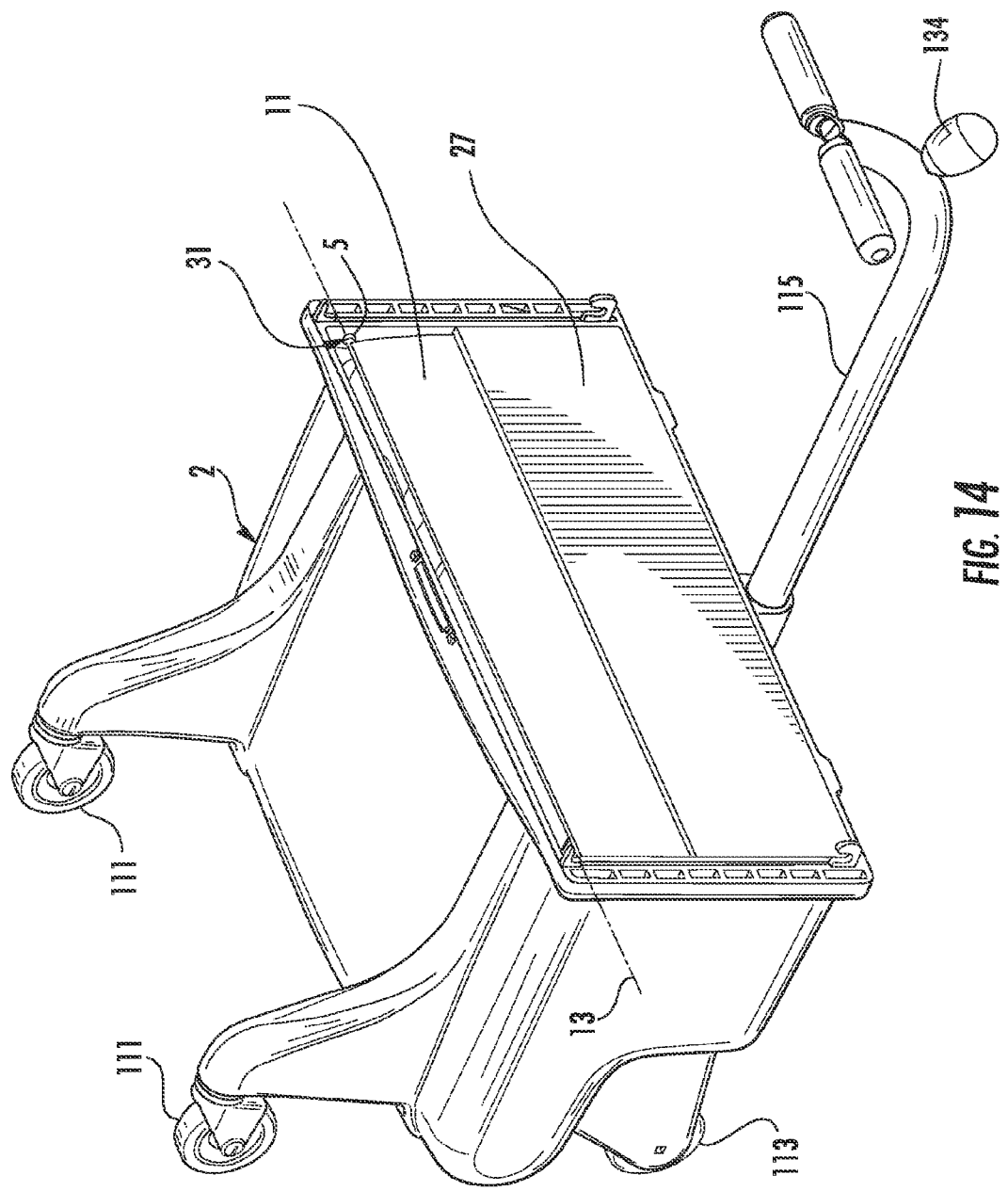
FIG. 14 is a perspective view of the bucket of FIGS. 11, 12 and 13.

The bucket in the embodiment of FIGS. 11 through 14 operates in the same manner as previously described with reference to FIGS. 1 through 10. The method of tilting the bucket in the embodiment of FIGS. 11 through 14 will be described. To filter the cleaning solution, the bucket 2 is tilted back until it is resting on its back on the floor F in the tilted position as shown in FIGS. 12 and 14 (block 2001). As the bucket 2 is rotated to the tilted position, the user grabs the tilting knob or grip 134 and pulls the cord 132 out from the bucket handle 115 (block 2002). This causes the enlarged end weight 136 secured to the end of the cord 132 to slide up the inside of the chamber 120 in the handle 115 until it is stopped at aperture 125. The user can lower and raise the bucket 2 between the upright vertical position and the tilted position without bending over by using cord 132. Once all of the dirty cleaning solution has drained into the filtering compartment 22 via fluid movement path A the user lifts up on the tilting knob or grip 134 and cord 132 which raises the bucket 2 back to the upright position as shown in FIG. 13 (block 2003). The weighted enlarged end 136, under the force of gravity, causes the tilting cord 132 to retract back into the bucket handle 115 which brings the tilting knob 134 back to the retracted position at the top of the handle 115 (block 2004). The mop bucket 2 allows the user to filter the dirty mop water to create clean cleaning solution whenever and wherever the mop bucket is located without the need to access a clean water source. As a result, the user does not waste time transporting the bucket from the mopping site to a clean water source, emptying the dirty cleaning solution, refilling the bucket with new cleaning solution, and transporting the bucket back to the mopping site. The method and apparatus for mopping and filtering dirty mop water allows the end user to filter the dirty cleaning solution without leaving the job site. The user is able to continue mopping with filtered water quickly and easily.

An embodiment of the wringer of the invention is shown generally at 200 in FIGS. 21 through 29 and comprises a housing 202 made of a rigid material such as molded plastic, metal or the like. The housing 202 comprises a pair of side walls 204 and 206 connected by front wall 208 and back wall 210 to define a generally rectangular housing. The housing may have any suitable shape and the shape of the illustrated housing 202 is for explanatory purposes. In one embodiment housing 202 is configured to mate with the top of bucket 2 such that the wringer 200 can be secured to bucket 2. A top 212 covers the housing and defines a relatively large opening 214 for receiving a mop. The bottom of the housing is open such that the opening 214 allows passage through the housing 202 into the bucket. While the wringer shown in FIG. 21 may be conveniently used with the filter bucket 2 of the invention, the wringer 200 may be used with any bucket. An adjustable roller 220 is mounted between the side walls 204 and 206 such that it may rotate along is long axis. A movable roller 230 is also mounted in the housing 202 parallel to the adjustable roller 220. Roller 220 is rotatably mounted at each end to a cam 222 such that the roller 220 can rotate relative to the cams 222. The cams 222 are used to adjust the position of roller 220 relative to roller 230. The roller 220 is able to move toward and away from movable roller 230 to increase or decrease the space between the rollers and the squeezing force exerted by the rollers on a mop located between the rollers. A control knob 224 is connected to each cam 222 via slots 226 formed in side walls 204 and 206 such that turning the knobs 224 turns the cams 222. The cams 222 are identical such that reference will be made to one cam 222. Cam 222 comprises a plurality of detents 222a formed at spaced intervals about the periphery thereof. In the illustrated embodiment the detents 222a are located every 90°. The cam 222 is eccentric relative to the axis of rotation C-C of the roller 220 such that each detent 222a is spaced a different distance from the axis C-C. To adjust the spacing between the rollers 220 and 230 and the pressure exerted by the rollers on a mop, cams 222 are used to position the adjustable roller 20 relative to movable roller 30. Knobs 224 are rotated causing the cams 222 to rotate relative to the housing to one of four positions 222a. Because cams 222 are eccentrically mounted relative to the axis of rotation C-C of roller 220, roller 220 is moved toward or away from roller 230 when knob 224 is turned. Detents 222a lock the cams 222 in one of the four positions against stop 223 to retain the roller 220 in the desired position relative to roller 230. Slot 226 limits movement of the roller 220 along the length of the slot such that when cams 222 are rotated the roller 220 is moved toward and away from roller 230 along slots 226.

Movable roller 230 has one end mounted to a first end 232a of swing arm 232. The opposite end of movable roller 230 is mounted to a first end 234a of swing arm 234. The opposite end 232b of swing arm 232 is mounted for pivoting movement in side wall 204 and the opposite end 234b of swing arm 234 is mounted for pivoting movement in side wall 206. The mechanism for mounting arms 232 and 234 to the housing are the same such that specific reference will be made to arm 232. Arm 232 has a cylindrical bearing 236 at end 232b that fits into a circular aperture 238 formed in side wall 204. The bearing 236 freely rotates in aperture 238 such that arm 232 can pivot about bearing 236 relative to the housing 202. A cap 240 having an enlarged head 241 is inserted into the bearing 236 and secured to arm 232 to fix the arm 232 to the housing 202 such that arm 232 can rotate but is otherwise fixed in the housing 202. The cap 240 may be press fit into the bearing 236, secured by welding, adhesive or screwthreads or the like.

Figure 22:
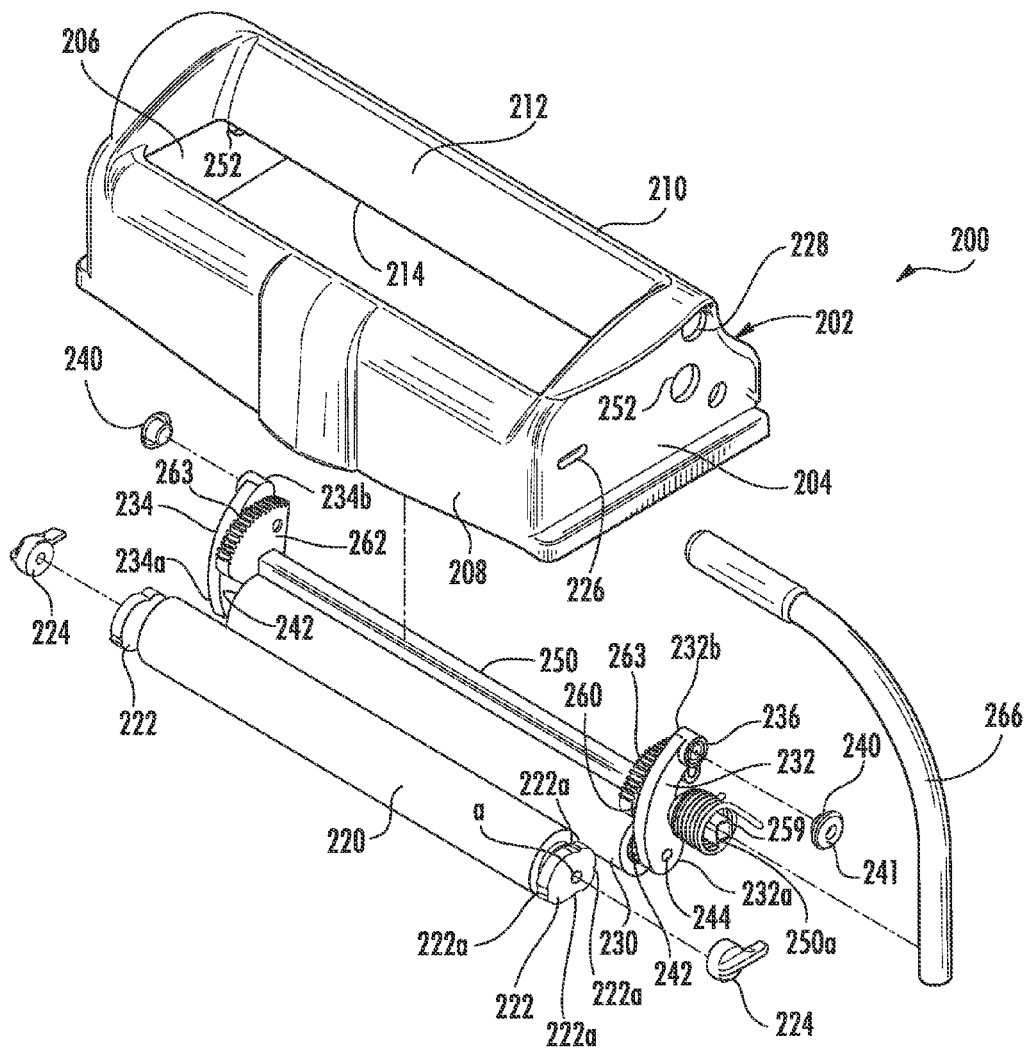
FIG. 22 is an exploded view of the wringer of FIG. 21.
Figure 22A:
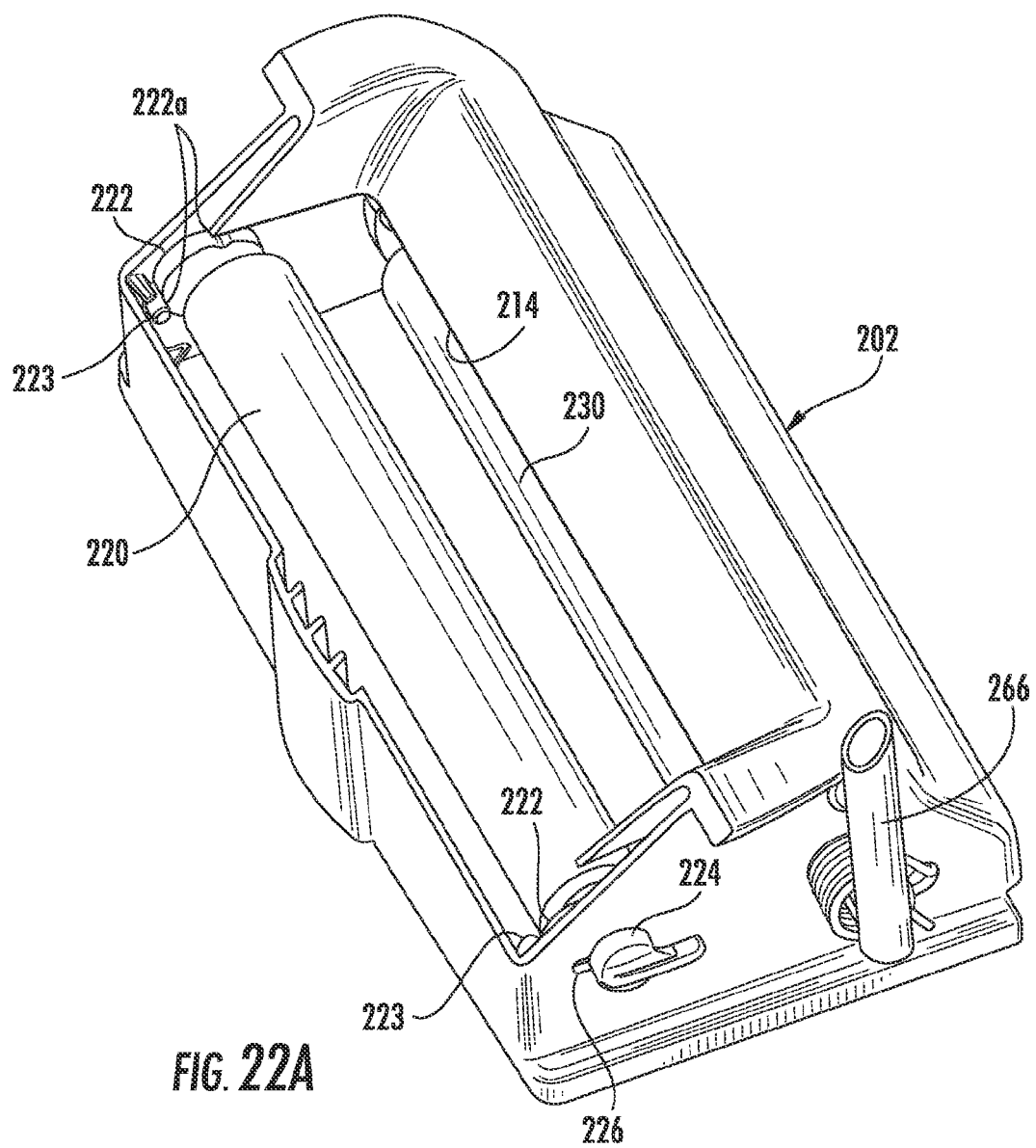
FIG. 22A is a perspective view showing the control for the adjustable roller of the wringer of FIG. 21.
Figure 26:
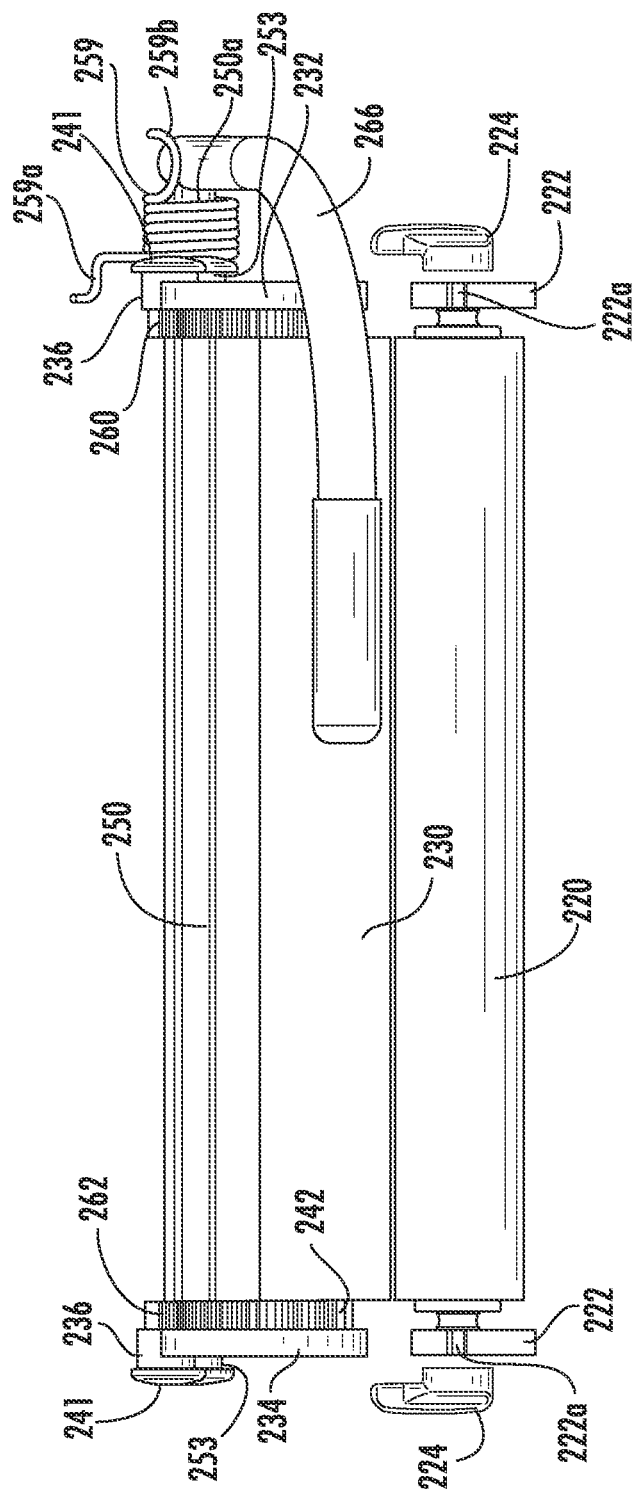
FIG. 26 is a top view showing the wringer mechanism of the wringer of FIG. 21.

Referring to FIGS. 22 and 26, roller 230 is mounted to the ends 232a and 234a of arms 232 and 234 in the same manner. A toothed gear 242 is fixed to each end of the roller 230 such that the roller 230 and gears 242 rotate together. An axle 244 extends between the arms 232 and 234 such that the roller 230 and gears 242 rotate together on axle 244 about the longitudinal axis of roller 230.

An actuating rod 250 is supported between housing side walls 204 and 206 such that the rod 250 can rotate along its longitudinal axis relative to housing 2. The ends of rod 250 are supported for rotational motion by bearings 253 that are supported in apertures 252 in side walls 204 and 206 such that the axis of rotation of rod 250 is parallel to the axes of rotation of rollers 220 and 230. Mounted to rod 250 for rotation with the rod are sector gears 260 and 262. The rod 250 may have a rectangular profile that engages rectangular apertures 254 in gears 260 and 262 such that the rod 250 is fixed to the gears. The sector gears 260 and 262 are positioned on rod 250 such that they are disposed inside of the swing arms 232 and 234 directly opposite to the gears 242. The sector gears 260 and 262 are provided with cam surfaces 264 that engage the toothed gears 242 to move the roller 230 into engagement with roller 220 as will hereinafter be described. The sector gears 260 and 262 are also provided with gear teeth 263 that engage the toothed gears 242 to rotate the roller 230 as will hereinafter be described.

The end 250a of rod 250 extends through aperture 252 and is connected to lever arm 266. Lever arm 266 is arranged substantially orthogonally to rod 250 and forms a handle that is pushed by the user to rotate rod 250 to actuate the wringer. A spring 259 returns the lever arm 266 and rod 250 to the non-actuated position when lever arm 266 is released by the user. Spring 259 may comprise a coil spring mounted on rod 250 having one end 259a fixed to housing 202 and the opposite end 259b fixed to lever arm 266 for movement therewith.

The operation of the wringer will be described with reference to FIGS. 23 through 25, 27 through 29 and 30. A mop is positioned between the rollers 220 and 230 with the top end of the mop, i.e. the end of the mop closest to the handle, between the rollers and the rest of the mop extending below the rollers in a bucket (Block 3001). The wringer 200 is shown in the non-actuated position in FIGS. 23 and 27 with the rollers 220 and 230 spaced from one another and lever 266 in the at rest position (Block 3002). Lever arm 266 is rotated by the user in the direction of arrow E causing rod 250 to rotate in the same direction, FIGS. 23 and 27 (Block 3003). As rod 250 rotates sector gears 260 and 262 also rotate in the same direction (Block 3004). The cam surfaces 264 on sector gears 260 and 262 contact gears 242 that are fixed to the opposite ends of roller 230 (Block 3005). The cam surfaces 264 are shaped such that as the sector gears 260 and 262 are rotated, the cam surfaces 264 force gears 242, and roller 230, toward roller 220 in the direction of arrow F, FIGS. 24 and 28. As sector gears 260 and 262 push against gears 242 the swing arms 232 and 234 are rotated about bearings 236 in the opposite direction F to the direction E of rotation of rod 250 and sector gears 260 and 262 (Block 3006). As swing arms 232 and 234 rotate the movable roller 230 is moved toward the adjustable roller 220 to the position shown in FIGS. 24 and 28 where the rollers are in contact or closely spaced from one another.

Figure 25:
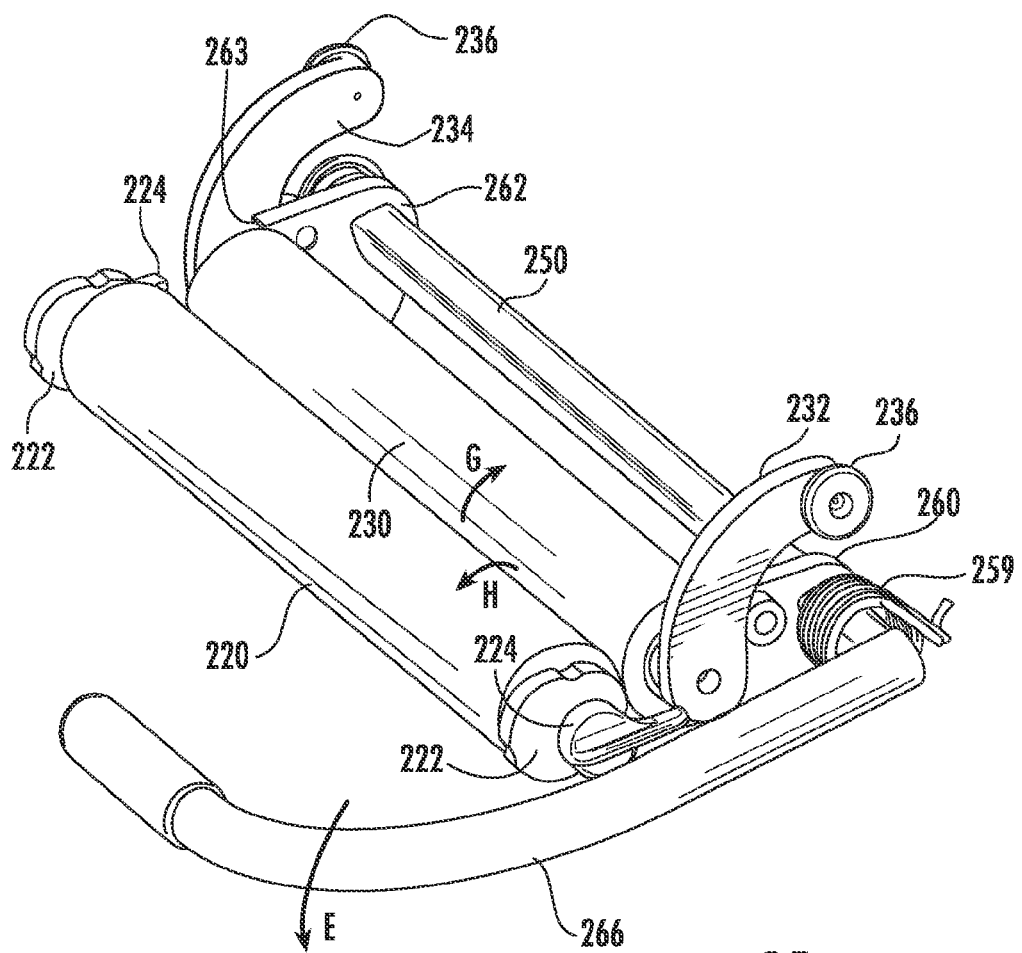

As handle 266 continues to rotate in the direction of arrow E to the position shown in FIGS. 25 and 29, roller 230 continues to swing toward roller 220 until the gear teeth 263 on sector gears 260 and 262 engage the gear teeth on gears 242 (Block 3007). When the gear teeth 263 on sector gears 260 and 262 engage the gear teeth on gears 242, cam surfaces 264 no longer move gears 242, roller 230 and swing arms 232 toward roller 220 and movement of the roller 230 toward roller 220 stops. The final distance between the rollers 220 and 230 is set by adjustment knobs 224 and cams 222. The engagement of teeth 263 of sector gears 260 and 262 with gears 242 causes roller 230 to rotate about its longitudinal axis in the direction of arrow G as shown in FIGS. 25 and 29 (Block 3008). The rollers 220 and 230 exert a compressive force on the mop to squeeze dirt and liquid from the mop and the mop exerts a reactive force on roller 220 causing it to rotate in the direction of arrow H (Block 3009). The direction of movement of the rollers 220 and 230 on the mop is upward away from the bucket in the direction of arrow I such that in addition to squeezing the mop the rollers 220 and 230 also pull the mop upward out of the bucket (Block 3010).

Figure 23:
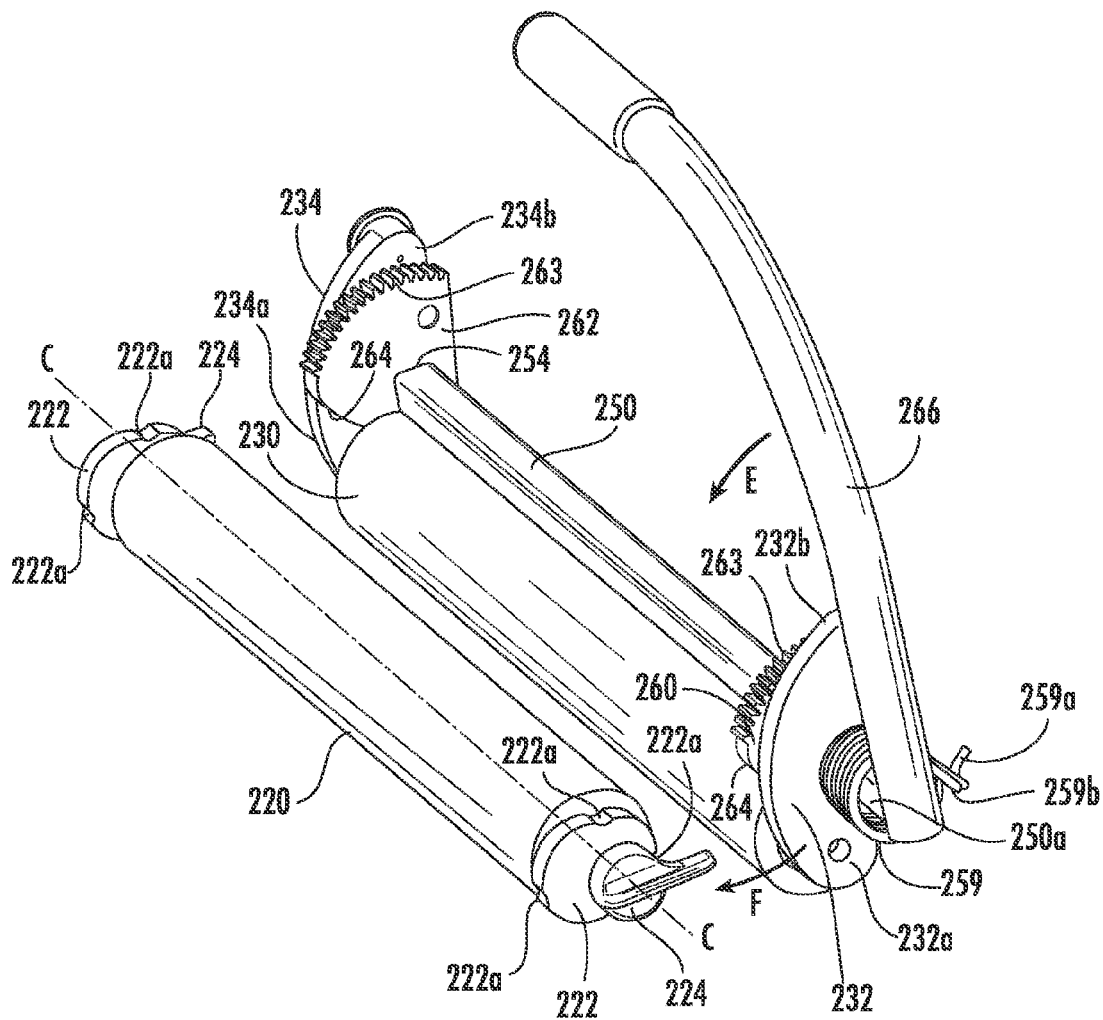
FIGS. 23 through 25 are perspective views showing the operation of the wringer mechanism of the wringer of FIG. 21.
Figure 24:
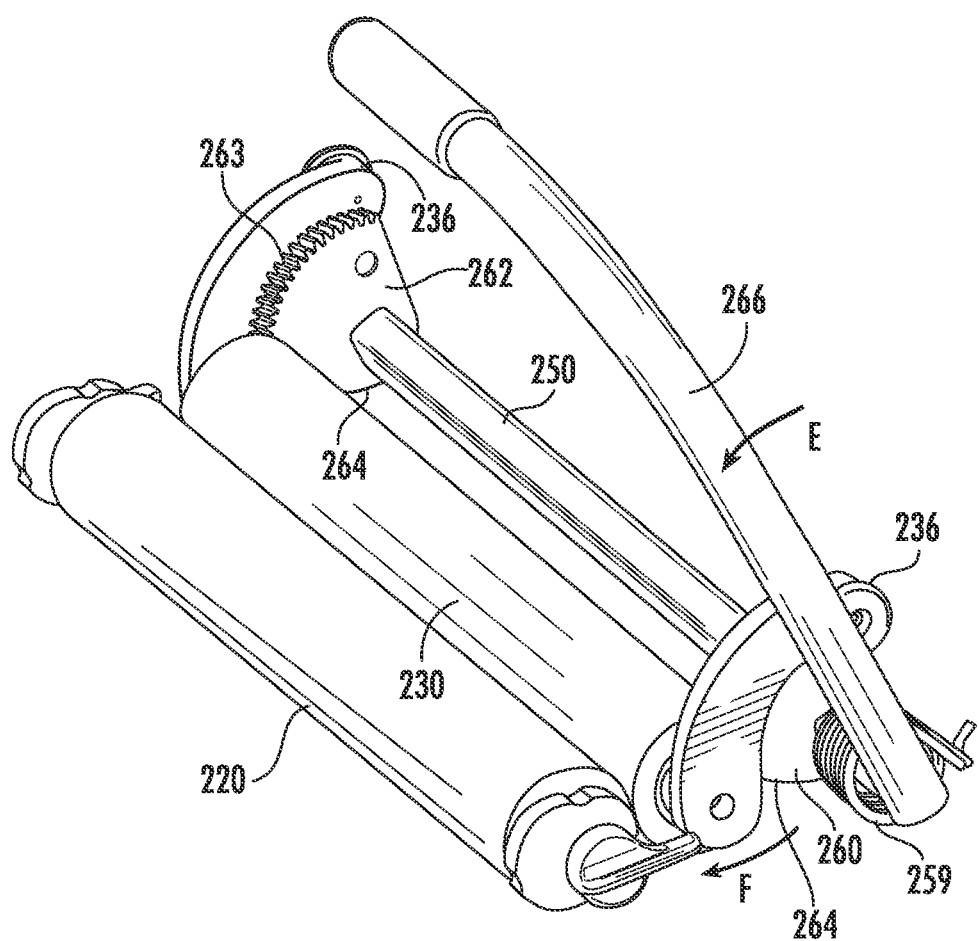
Figure 27:
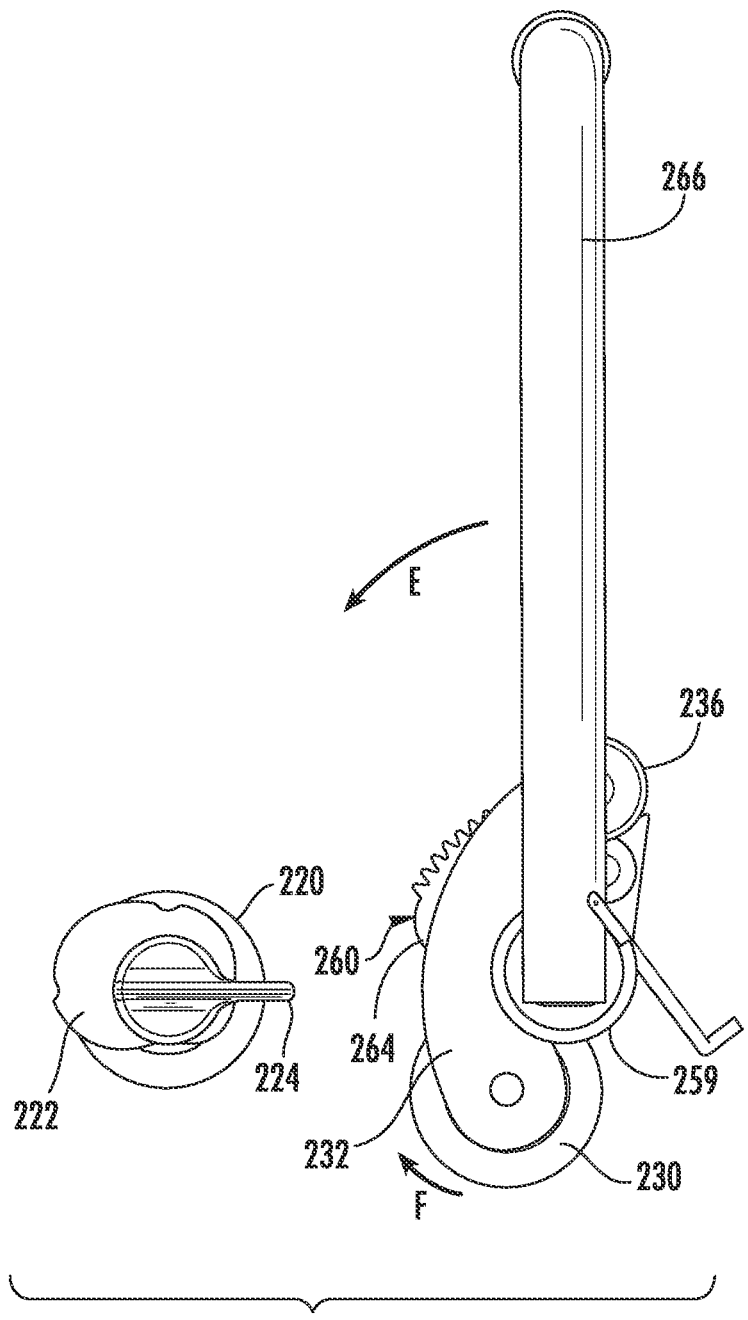
Figure 28:
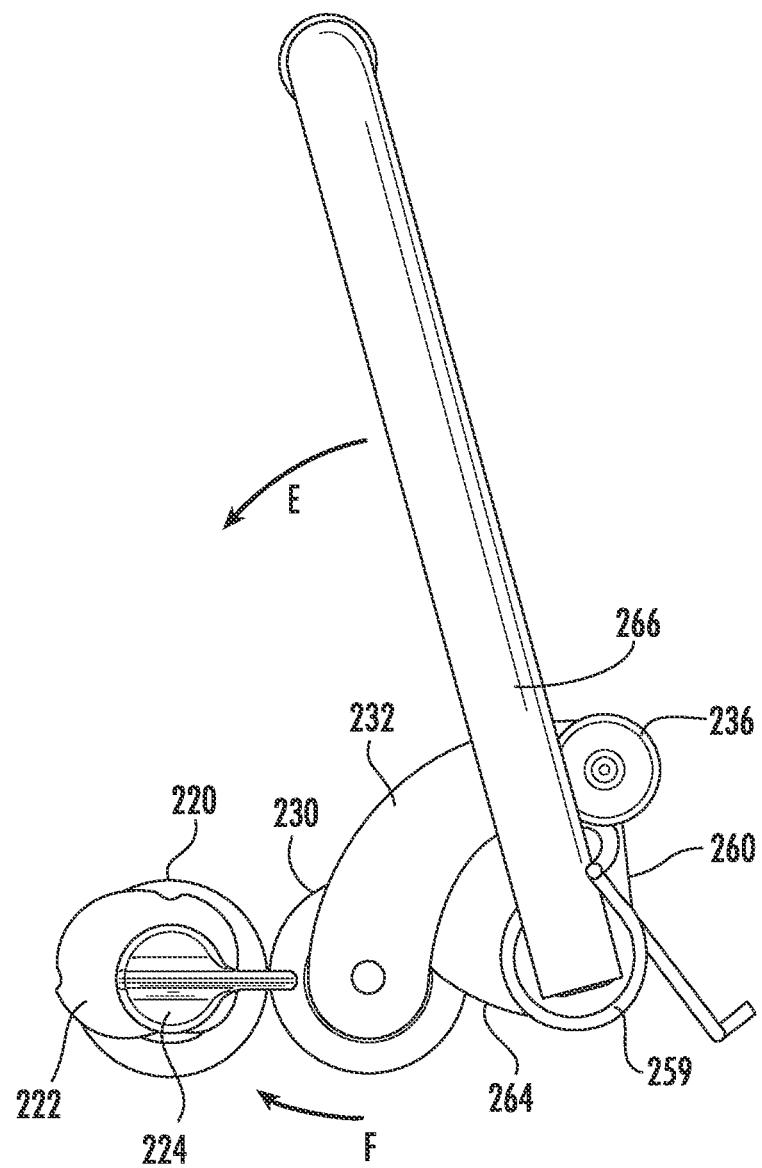
Figure 30A:
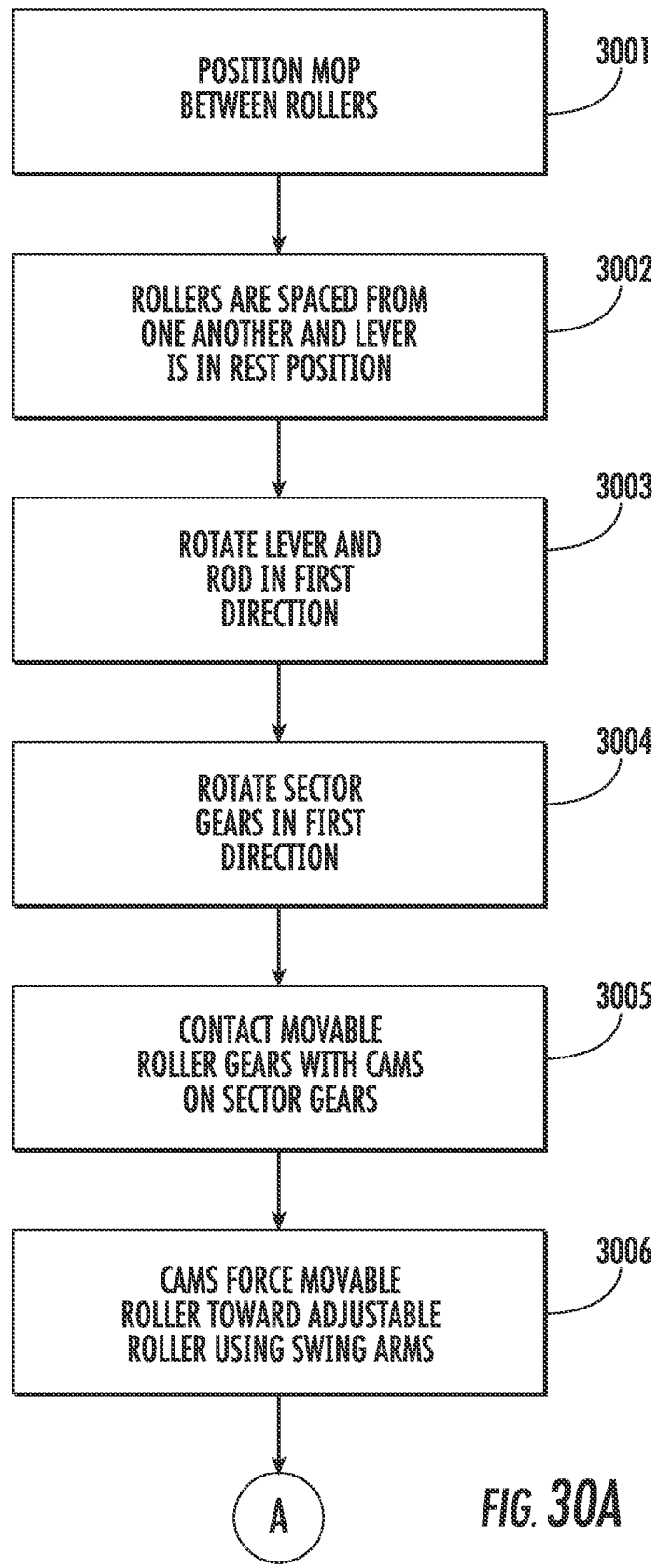
FIGS. 30A and 30B is a block diagram showing the operation of the wringer of FIG. 21.
Figure 30B:
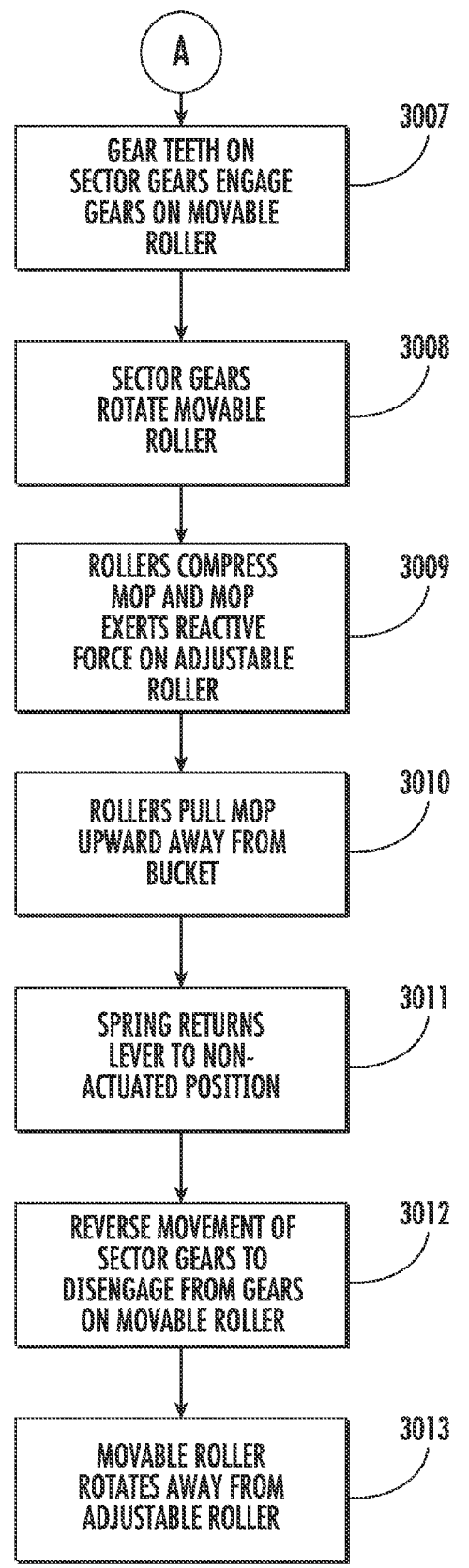

When lever arm 266 reaches its end of travel as shown in FIGS. 25 and 29 the user releases the lever arm 266 and the spring 259 returns the lever arm 266 to the non-actuated position of FIGS. 23 and 27 (Block 3011). As the lever arm 266 is rotated to this position the rotation of rod 250 and sector gears 260 and 262 is reversed until the gear teeth 263 of sector gears 260 and 262 disengage from the gears 242 (Block 3012). The weight of roller 230 and swing arms 232 and 234 cause the swing arms 232, 234 to rotate downward and away from roller 220 in the direction opposite arrow F (Block 3013).

Referring to FIGS. 31 through 36 an embodiment of a mop is shown comprising a handle 301 connected to a frame 302 at a universal joint 303. The frame 302 and components could be stamped metal, molded plastic or wire form or other material. A mop cover 304 is removably secured to frame 302 as will hereinafter be described. The frame 302 comprises two frame members 307, 308 joined together by hinge 306. The frame members 307, 308 comprise generally planar members that are shaped to create support frame 302 that is sized and shaped to engage and support mop cover 304. Frame member 307 comprises a top side 307c and a bottom side 307d and frame member 308 comprises a top side 308c and a bottom side 308d. Frame member 307 includes a leading edge 307a and a trailing edge 307b and frame member 308 includes a leading edge 308a and a trailing edge 308b. The terms "leading edge" and "trailing edge" are used for convenience in describing the shape of the frame, in actual use either edge may be the front of the mop as the mop is pushed over a surface. In the illustrated embodiment the first frame member 307 and the second frame member 308 have similar shapes; however, the frame members may have different shapes provided the frame 302 fits the mop cover 304. The hinge 306 may comprise a plurality of interdigitated knuckles 309a, 309b formed on the leading edges 307a, 308a of frame members 307, 308, respectively, that are rotatably connected to one another by rods 310 such that the frame members 307 and 308 can rotate relative to one another about hinge 306 between the folded position shown in FIGS. 31 and 32 and the collapsed position shown in FIG. 36a.

Mop cover 304 is provided on its top surface 304b with pockets 314 that are engaged by the frame 302 such that the mop cover 304 is retained on frame 302 and covers the bottom side of frame 302. The bottom surface 304a of mop cover 304 is provided with a surface suitable for cleaning a floor or other surface and may comprise an absorbent, abrasive, dust attractive surface or the like. In the illustrated embodiment the pockets 314 are formed at the four corners of cover 304 and receive the four outer corners of frame 302. Pockets may be formed over other parts of the cover 304.

Spaced channels 320 and 322 are provided on the top side of one of the frame members 307, 308. In the illustrated embodiment the channels 320, 322 are provided on top side 307c of frame member 307 and are spaced equally from the center of the frame member 307. Channels 320 and 322 extend between the leading edge 307a and trailing edge 307b of the frame member 307. A yoke 328 is attached to frame member 307 such that the yoke may slide in the channels 320, 322 between the leading edge 307a and trailing edge 307b and may pivot relative to the frame member 307. Specifically, yoke 328 includes a first pin 324 that extends laterally into channel 320 and a second pin 326 that extends laterally into channel 322. The pins 324 and 326 are free to slide along the length of the channels 320 and 322 and to pivot in the channels such that a translating pivot axis c-c, that extends through pins 324 and 326, allows the frame 302 to pivot and translate relative to the yoke 328.

Handle 301 is pivoted to the yoke 328 at pivot 332 such that the handle 301 may pivot relative to the yoke 328 about pivot axis d-d. Axis c-c is orthogonal to axis d-d creating universal joint 303 where the handle 301 may pivot relative to the frame 302 about two perpendicular axes. The universal joint 303 allows the user to use a figure-8 mopping motion and provides the user with a similar ergonomic feel to the figure eight mopping motion of a string mop. The handle 301 may have any convenient length. Further, a handle extension 333 may be releasably connected to handle 301. Handle 301 may comprise a socket 301a that extends along the length of the handle. Handle extension 333 is releasably inserted into the socket and is locked relative to the handle 301 using any suitable releasable locking device 301b such as a ball and detent, screw threads or the like.

Latches 340 are provided to lock frame member 307 to frame member 308 in the folded position. Latch 340 comprises a first hook 341 formed on frame member 308 that releasably engages a mating hook 343 on frame member 307 (see FIG. 33). The hooks 341 and 343 are deformable such that when frame member 307 is pushed towards frame member 308 the hooks strike each other and deform such that member 341a of hook 341 is disposed behind member 343a of hook 343. The hooks retain the frame members 307 and 308 in the folded position but the frame members 307 and 308 can be forced apart to deform and separate the hooks 341 and 343. The latch may have other configurations and magnets may be used to lock the frame members 307, 308 together.

Slots 344 and 346 are formed in the edges 307b, 308b of frame members 307 and 308 to allow the yoke 328 to pivot relative to the folded frame 302 over 180° of relative motion such that the handle may extend from either side of the folded frame when the opposite side of the frame is disposed on the floor or other surface.

The mop occupies the folded position shown in FIGS. 31, 32 and 36c when the mop is in the use position suitable for mopping a floor or other surface. In the folded position, yoke 328 and handle 301 are positioned at the outer ends 320b and 322b of the channels 320 and 322, respectively, and the top side 307c of the first frame member 307 is closely adjacent to and parallel to the top side 308c of the second frame member 308. The frame members 307 and 308 are secured to one another by the latch 340 such that the frame 302 is maintained in the folded position during use of the mop.

Figure 34:
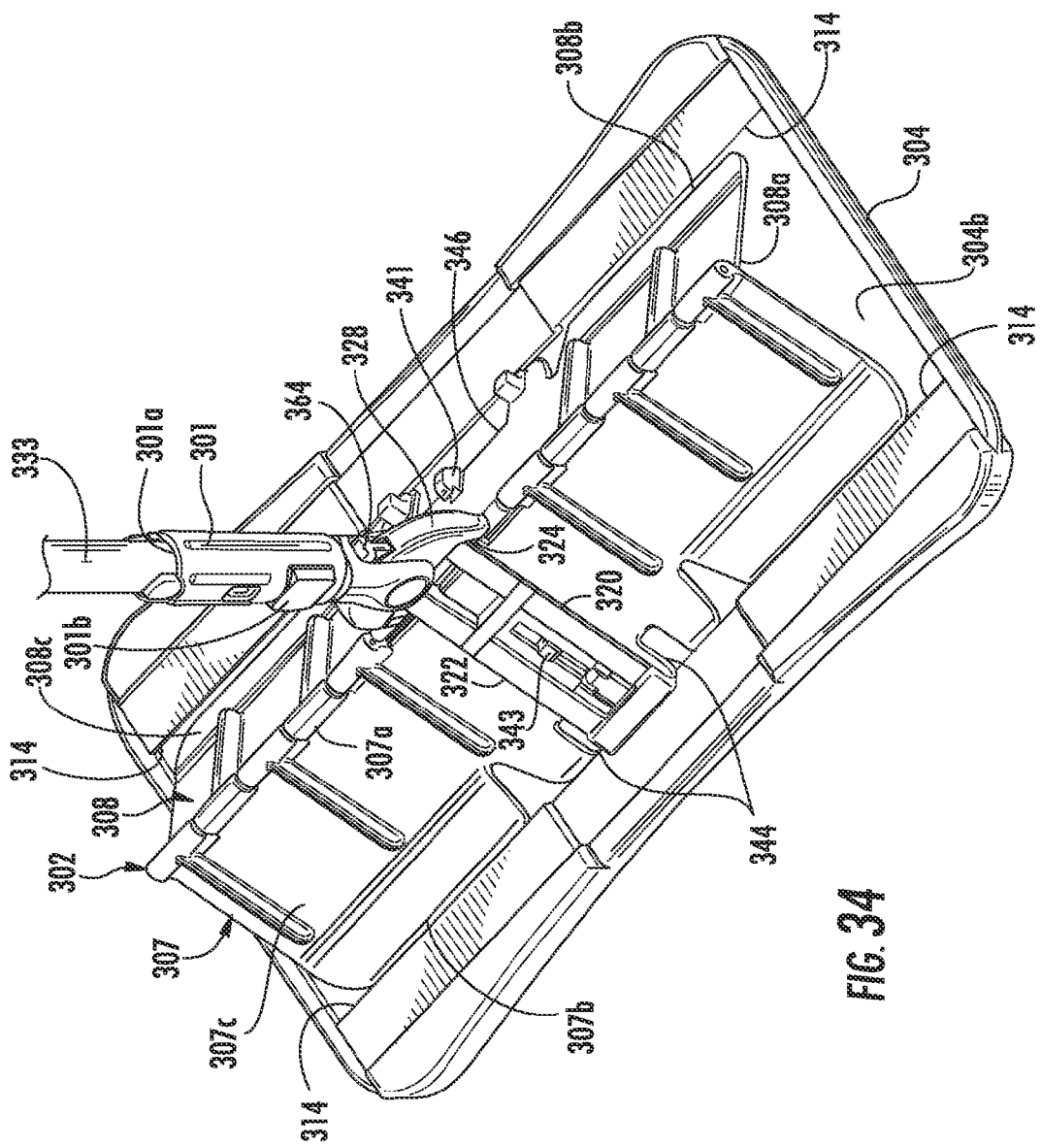
FIGS. 34 and 35 are perspective views of the mop frame of FIG. 31.

The frame 302 occupies the collapsed position shown in FIGS. 34 and 36a when the frame 302 is inserted into the mop cover 304 or removed from the mop cover 304. In this position the yoke 328 and handle 301 are positioned at the inner ends 320a, 322a of the channels 320 and 322, respectively, and the first frame member 307 and the second frame member 308 are suspended from the handle 301. The frame members 307 and 308 hang down from yoke 328 such that the bottom sides 307c, 308c of the frame members 307, 308 respectively, are opposite to and face one another but are not connected to one another other than at hinge 6. The frame members 307 and 308 are disposed at an angle relative to one another such that the leading edges 307a and 308a are spaced from one another.

Figure 35:
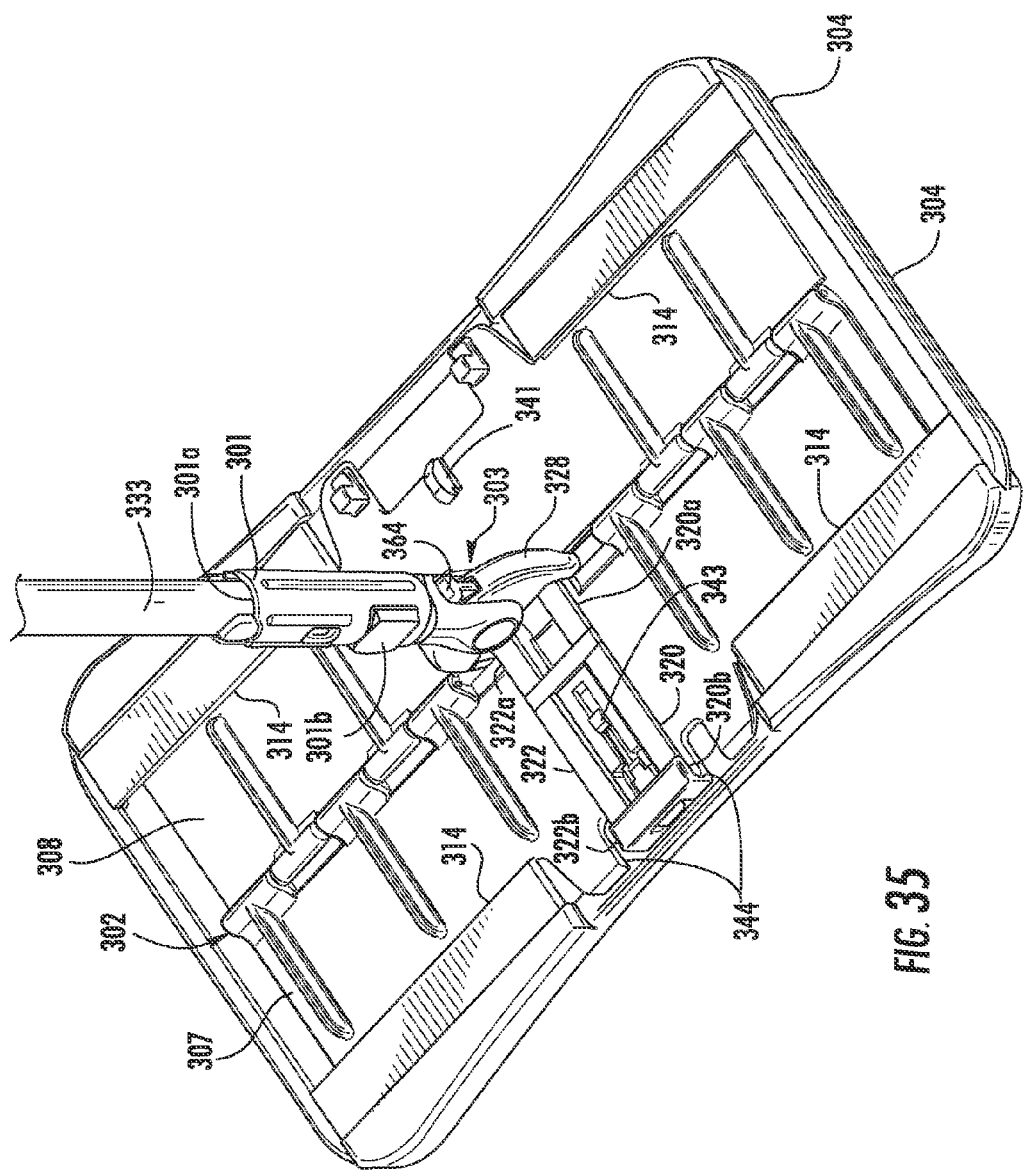
Figure 36:
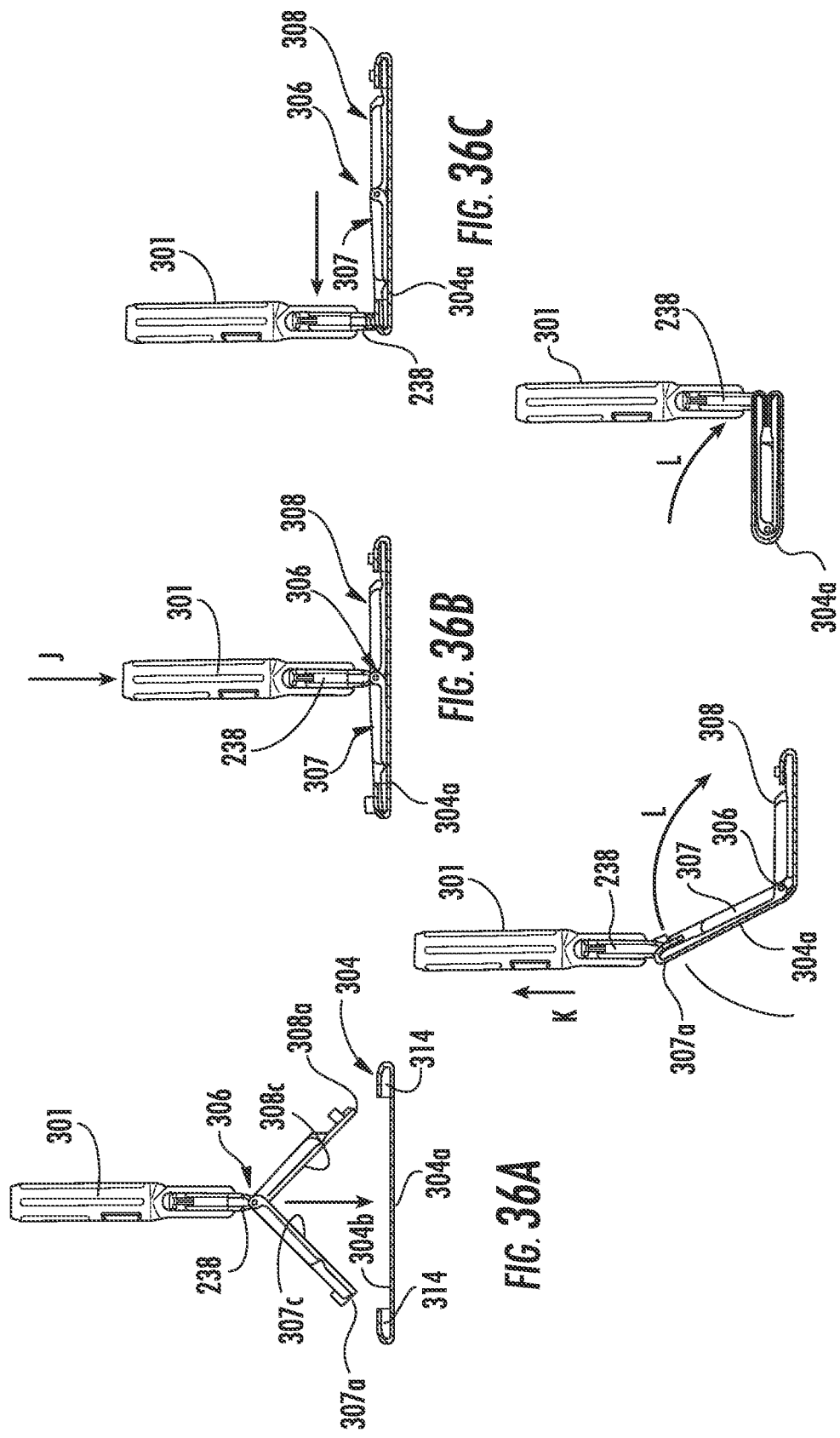
FIGS. 36a through 36e are side views of the mop frame of FIG. 31 showing the operation of the frame.
Figure 37:
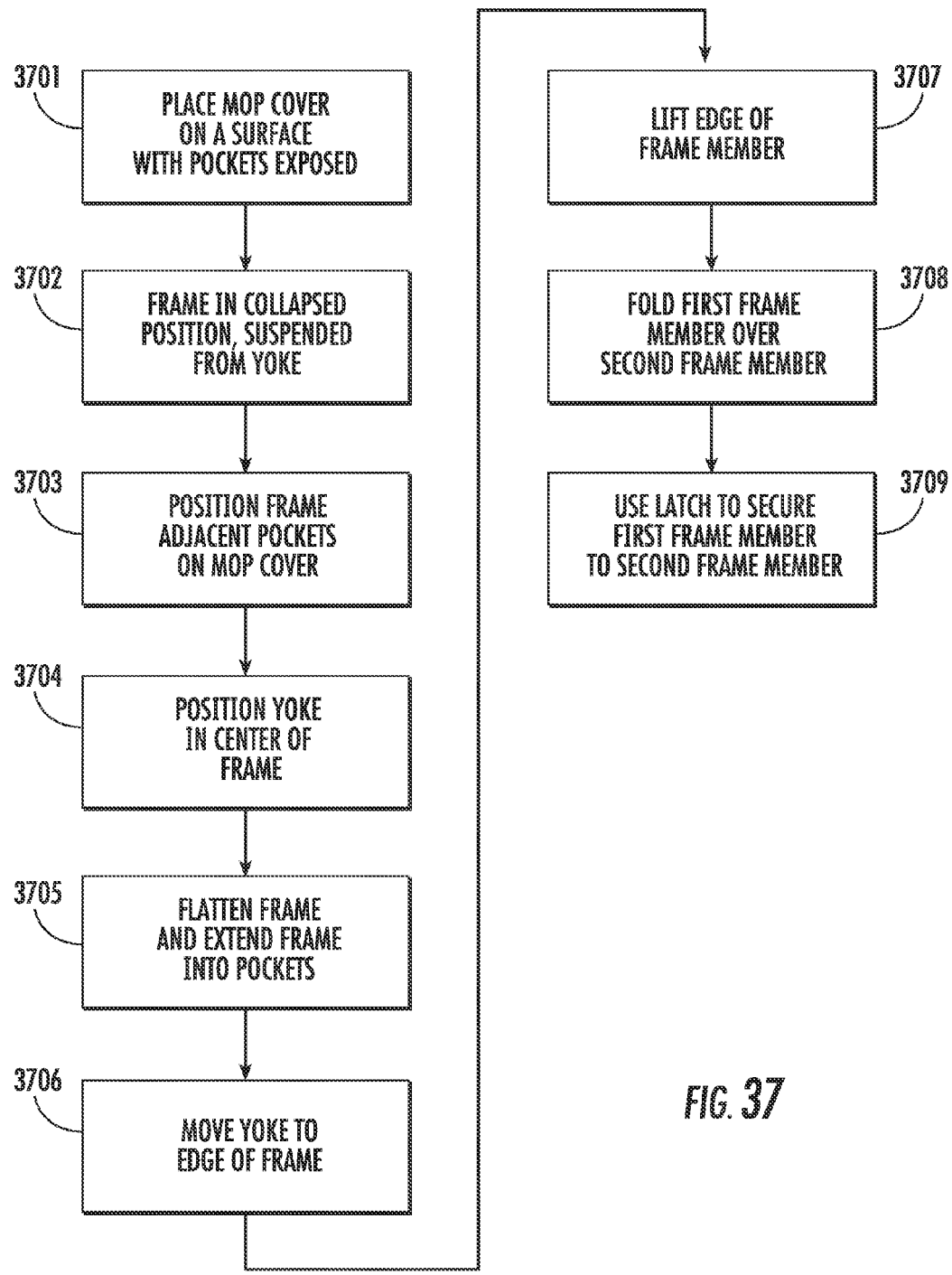
FIG. 37 is a block diagram showing the operation of the mop frame.

Between the folded position of FIGS. 31, 32 and 36c and the collapsed position of FIGS. 34 and 36a, the frame 302 may occupy the intermediate expanded position shown in FIGS. 35 and 36b. In this position the yoke 328 and handle 301 are positioned at the inner ends 320a, 322a of the channels 320 and 322, respectively. The user can press on the handle 301 in the direction of arrow J to press the frame members 307, 308 against a floor or other surface to force the frame members 307, 308 apart until they occupy the coplanar flat position shown in FIG. 36b. The frame members 307 and 308 are able to rotate relative to one another about hinge 306 between the folded position and collapsed position passing through the intermediate flat position.

In use, the mop cover 4 is laid flat on a floor or other surface, FIG. 36a (block 3701). The frame 2 is in the collapsed position where the frame members 307, 308 are suspended from yoke 328, FIG. 36a (block 3702). The four corners of the frame 2 are positioned opposite the respective four corner pockets 14 of the mop cover 4 (block 3703). The yoke 28 is positioned near the center of the frame 302 at the first end 320a, 322a of the channels 320, 322, respectively (block 3704). The handle 301 is pressed down to flatten the frame 302 and extend the corners of the frame 302 into the pockets 314 of the mop cover 302, FIG. 36b (block 3705). The yoke 328 is slid from the center position, FIG. 30b, to the edge position, FIG. 30c, where the yoke 328 is moved to the outer ends 320b, 322b of the channels 320, 322 (block 3706). The handle 301 is lifted up in the direction of arrow K to lift the leading edge 307b of frame member 307, FIG. 36d (block 3707). The frame member 307 is then folded about hinge 306 over the frame member 308 in the direction of arrow L, FIG. 36d, FIG. 12 (block 3708). The frame member 307 is secured to the frame member 308 by latch 340, FIG. 36e (block 3709). The mop is then ready for use in the folded mopping configuration. In the folded position a two-sided mop is provided where the handle 301 may extend from either side of the folded frame 302 such that either side of mop cover 304 may be used for cleaning.

Figure 33:
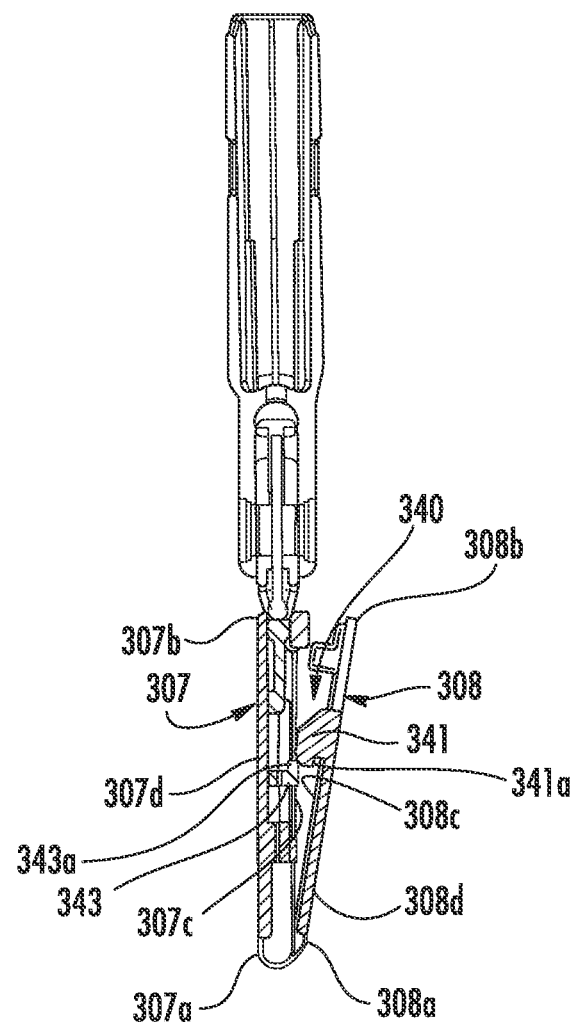
FIG. 33 is a section view taken along line 32-32 of FIG. 31 showing the frame in a partially open position.

To remove the mop cover 304 from the frame 302 the above steps are reversed. The user lifts on handle 301 such that the frame 302 is suspended from the yoke 328 as shown in FIGS. 31 and 32. The user pries apart the two frame members 307, 308 to release latch 340. To pry apart frame members 307 and 308 a plunger 360 is mounted in a passageway 361 in the yoke 328 such that the plunger can be reciprocated toward and away from the frame 302. The lower end of plunger 360 is formed with an enlarged head 362 that can be forced between the edges 307b and 308b of frame members 307 and 308 to force the ends of the frame members apart and unlock latch 340 as shown in FIG. 33. The plunger 360 comprises wings 364 that extend out from the sides of handle 301 such that the user can grasp wings 364 and force the plunger 360 down into engagement with the frame members 307 and 308 to the position of FIG. 31. The plunger 360 is raised after the frame members 307 and 308 are separated. When the latch 340 is unlocked the frame opens to the position shown in FIG. 36d. The user moves the handle 301 and yoke 328 to the center position shown in FIG. 36b and lifts the handle such that the frame members 307 and 308 fall down in the collapsed position shown in FIG. 36a. In this position the mop cover 304 falls from the frame 302. The frame 302 provides a two-sided mop that allows the user to attach and remove the mop cover 304 from the frame 302 without touching the mop cover 304.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A mop bucket comprising:
an internal compartment defined by a side wall and a bottom wall for retaining a liquid;
a first agitator blade supported in the internal compartment and a second agitator blade supported in the internal compartment such that the first agitator blade and the second agitator blade are spaced from one another a distance sufficient to receive a mop in a space between the first agitator blade and the second agitator blade in the liquid, said first agitator blade having a first bottom edge and said second agitator blade having a second bottom edge spaced from the first bottom edge and the first bottom edge and the second bottom edge being spaced from the bottom of the internal compartment such that a mop may be inserted between the first agitator blade and the second agitator blade past the first bottom edge and the second bottom edge, said first agitator blade comprising a plurality of generally horizontally extending first fins extending from a vertically disposed first planar support surface and said second agitator blade comprising a plurality of generally horizontally extending second fins extending from a vertically disposed second planar support surface, the plurality of first fins face the plurality of second fins across the space such that a mop may be reciprocated vertically in the space in a direction transverse to the plurality of first fins and the plurality of second fins.

2. The mop bucket of claim 1 wherein the first agitator blade and the second agitator blade are supported below a liquid such that a soil from a mop is suspended in the liquid.

3. The mop bucket of claim 1 wherein the first agitator blade and the second agitator blade are submerged below the surface of a cleaning fluid.

4. The mop bucket of claim 1 wherein the first planar support is connected to and supported by a first bracket and the second planar support is connected to and supported by a second bracket, the first bracket and the second bracket being connected to the side wall.

5. The mop bucket of claim 4 wherein a bottom end of the first bracket and the second bracket is each formed with spaced flanges.

6. The mop bucket of claim 5 wherein the spaced flanges surround a flange extending from the bucket.

7. The mop bucket of claim 1 wherein an unobstructed space is created between adjacent ones of the plurality of fins.

8. The mop bucket of claim 1 wherein the plurality of fins on the first planar support and the plurality of fins on the second planar support are spaced from one another a distance such that a first surface and a second surface of a mop contact the plurality of fins on the first planar support and the plurality of fins on the second planar support, respectively.

9. The mop and bucket of claim 1 wherein the plurality of first fins and the plurality of second fins comprise thin planar members, wherein the thin planar members terminate in longitudinally extending edges arranged such that the longitudinally extending edges of the plurality of first fins face the longitudinally extending edges of the plurality of second fins across the space where the longitudinally extending edges are dimensioned to extend for substantially the width of a mop that is to be cleaned by the first agitator blade and the second agitator blade.

10. A mop and mop bucket comprising:
a flat mop having a width and a first planar cleaning surface and a second planar cleaning surface, the first planar cleaning surface and the second planar cleaning surface being disposed substantially parallel to one another;
a bucket comprising a compartment defined by a side wall for retaining a liquid;
a first bracket supported in the compartment and supporting a first agitator blade and
a second bracket supported in the compartment and supporting a second agitator blade such that the agitator blades are spaced from one another a distance sufficient to receive the mop such that the first planar cleaning surface faces the first agitator blade and the second planar cleaning surface faces the second agitator blade, said first agitator blade and said second agitator blade each comprising a plurality of bristles extending from a planar support surface such that the plurality of bristles on the first agitator blade extend for substantially the width of the first planar cleaning surface and the plurality of bristles on the second agitator blade extend for substantially the width of the second planar cleaning surface the plurality of bristles on the first agitator blade being spaced from the plurality of bristles on the second agitator blade the distance.

11. The mop bucket of claim 10 wherein the plurality of bristles are rubber.

12. The mop bucket of claim 10 wherein the plurality of bristles comprise monofilament.

13. A mop and mop bucket comprising:
a flat mop having a first planar surface and a second planar surface, the first planar surface and the second planar surface being disposed substantially parallel to one another;
a bucket comprising an internal compartment defined by a side wall for retaining a liquid;
a first agitator blade supported in the internal compartment and a second agitator blade supported in the internal compartment such that the first agitator blade and the second agitator blade are spaced from one another a distance sufficient to receive the mop in a space between the first agitator blade and the second agitator blade in the liquid, said first agitator blade having a first bottom edge and said second agitator blade having a second bottom edge spaced from the first bottom edge and the first bottom edge and the second bottom edge being independently connected to the internal compartment such that the mop may be inserted between the first agitator blade and the second agitator blade past the first bottom edge and the second bottom edge, said first agitator blade comprising a plurality of generally horizontally extending first fins extending from a vertically disposed first planar support surface and said second agitator blade comprising a plurality of generally horizontally extending second fins extending from a vertically disposed second planar support surface, the plurality of first fins face the plurality of second fins face across the space such that the mop may be reciprocated vertically in the space in a direction transverse to the plurality of first fins and the plurality of second fins with the first planar surface facing the first agitator blade and the second planar surface facing the second agitator blade.

14. The mop and bucket of claim 13 wherein the plurality of first fins and the plurality of second fins comprise thin planar members, wherein the thin planar members terminate in longitudinally extending sides arranged such that the longitudinally extending sides of the plurality of first fins face the longitudinally extending sides of the plurality of second fins across the space where the longitudinally extending sides are dimensioned to extend for the width of the first planar surface and the second planar surface.

* * * * *